United States Patent
Adler et al.

(10) Patent No.: US 6,552,826 B2
(45) Date of Patent: *Apr. 22, 2003

(54) FACSIMILE NETWORK

(75) Inventors: B. Michael Adler, Dallas, TX (US); Tommy Wayne Quaid, Jr., Dallas, TX (US); Bruce Willard Graham, Littleton, CO (US); John Claybron Poss, Dallas, TX (US); David Wayne Thorn, Richardson, TX (US)

(73) Assignee: WorldQuest Network, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/887,930

(22) Filed: Jun. 21, 2001

(65) Prior Publication Data

US 2001/0035977 A1 Nov. 1, 2001

Related U.S. Application Data

(63) Continuation of application No. 08/803,898, filed on Feb. 21, 1997, now Pat. No. 6,256,115.

(51) Int. Cl.[7] .................................................. H04N 1/32
(52) U.S. Cl. ...................... 358/442; 358/407; 358/439; 379/100.17
(58) Field of Search .............................. 358/403–407, 358/434–442; 379/100.14, 100.17

(56) References Cited

U.S. PATENT DOCUMENTS

| | | | | |
|---|---|---|---|---|
| 5,546,388 A | * | 8/1996 | Lin | 370/389 |
| 5,739,919 A | * | 4/1998 | Lee et al. | 358/442 |
| 5,790,641 A | * | 8/1998 | Chan et al. | 358/434 |
| 6,256,115 B1 | * | 7/2001 | Adler et al. | 358/442 |

* cited by examiner

Primary Examiner—Jingge Wu
(74) Attorney, Agent, or Firm—Howison & Arnott, L.L.P.

(57) ABSTRACT

A facsimile network includes a plurality of nodes (10)–(14) which are disposed at different locations in the world. An originating fax machine (16) is associated with one of the nodes (10) for transmitting a fax over a local public telephone network (PSTN) (18). When the node (10) receives the fax transmission in the normal transmission mode, it then converts it to a digitized compressed and encrypted image which is transmitted over a primary network (24), such as the Internet, to a destination node (14) by a predetermined route. The node (14) then decompresses and de-encrypts the image and converts it to a facsimile image for transmission to a destination fax (20) in a normal mode over a local PSTN (22). A node (12) operates as a central node which can also receive the transmission for routing directly to the fax or for directing via another network link to the node (14).

24 Claims, 10 Drawing Sheets

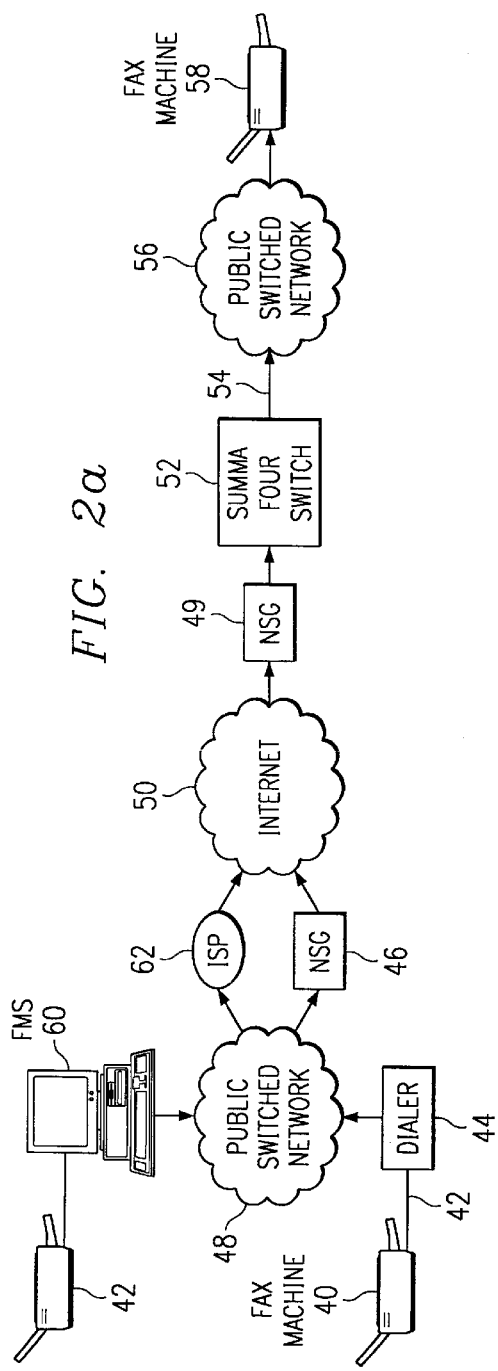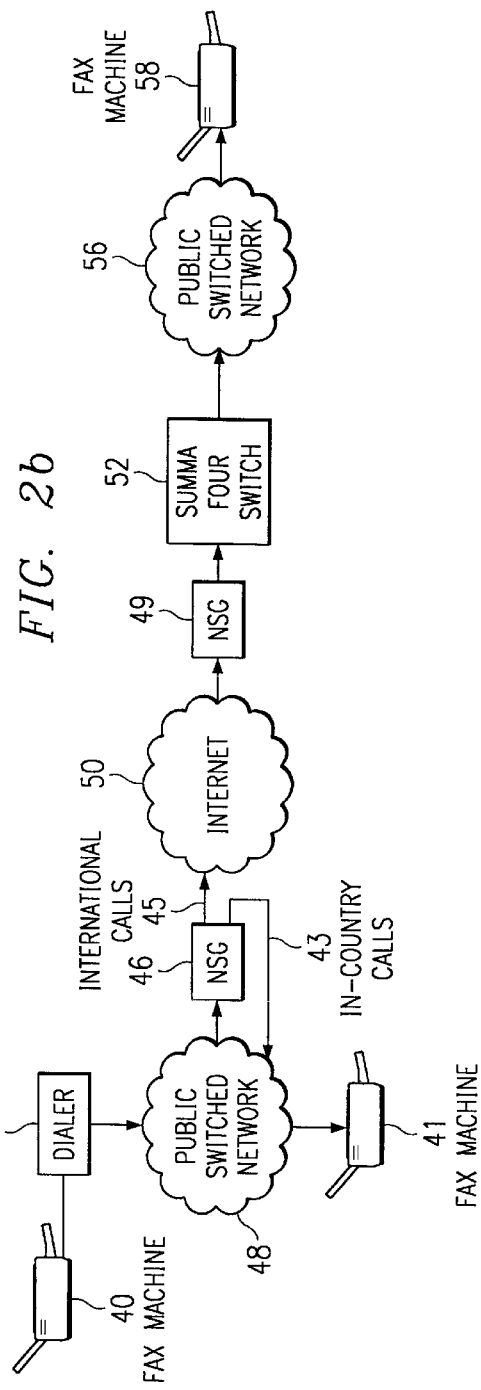

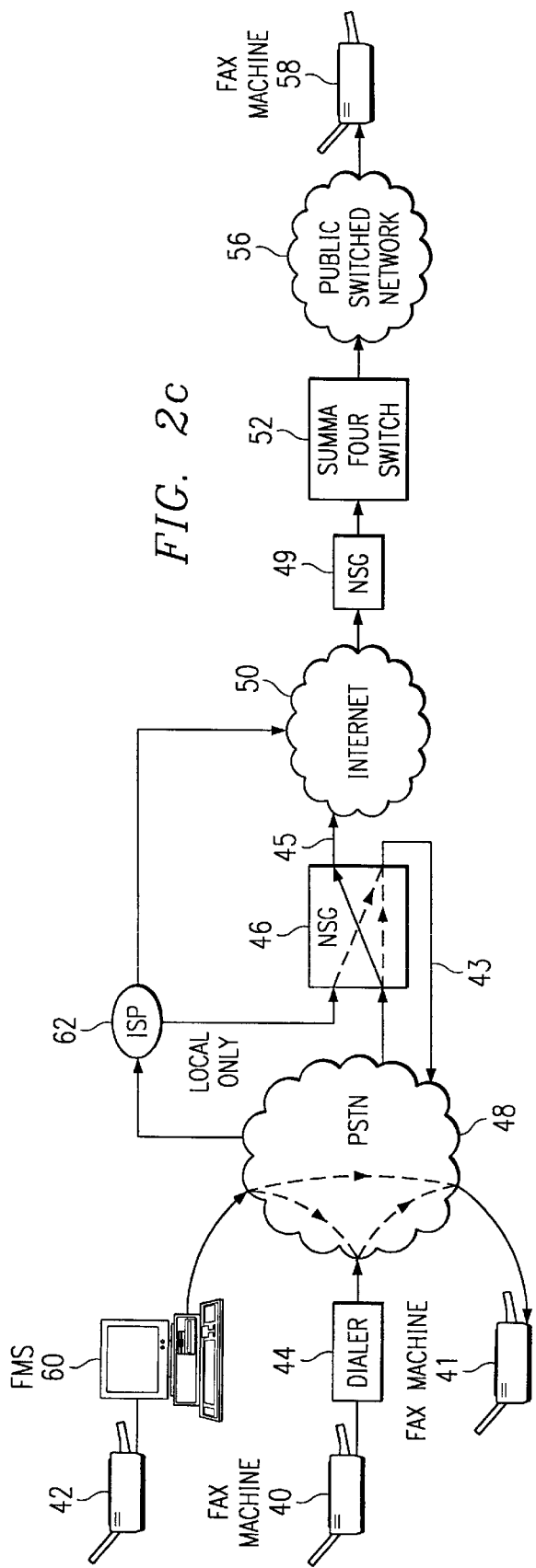
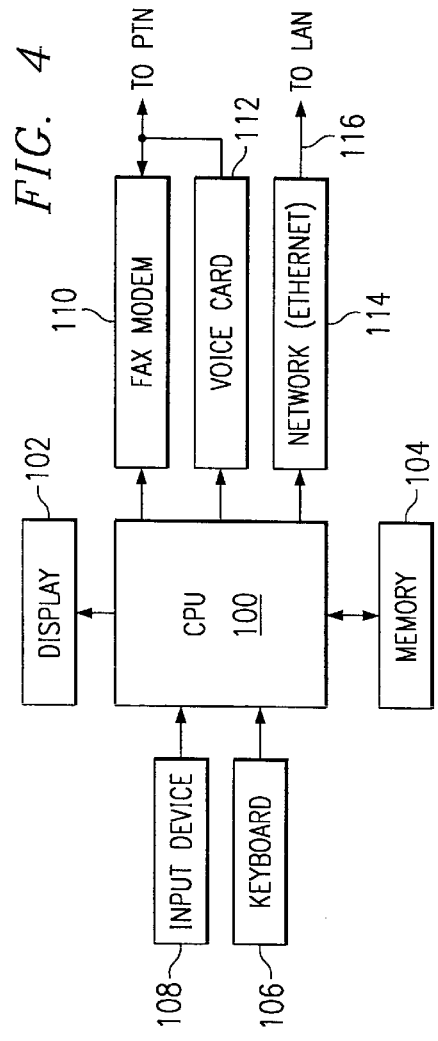

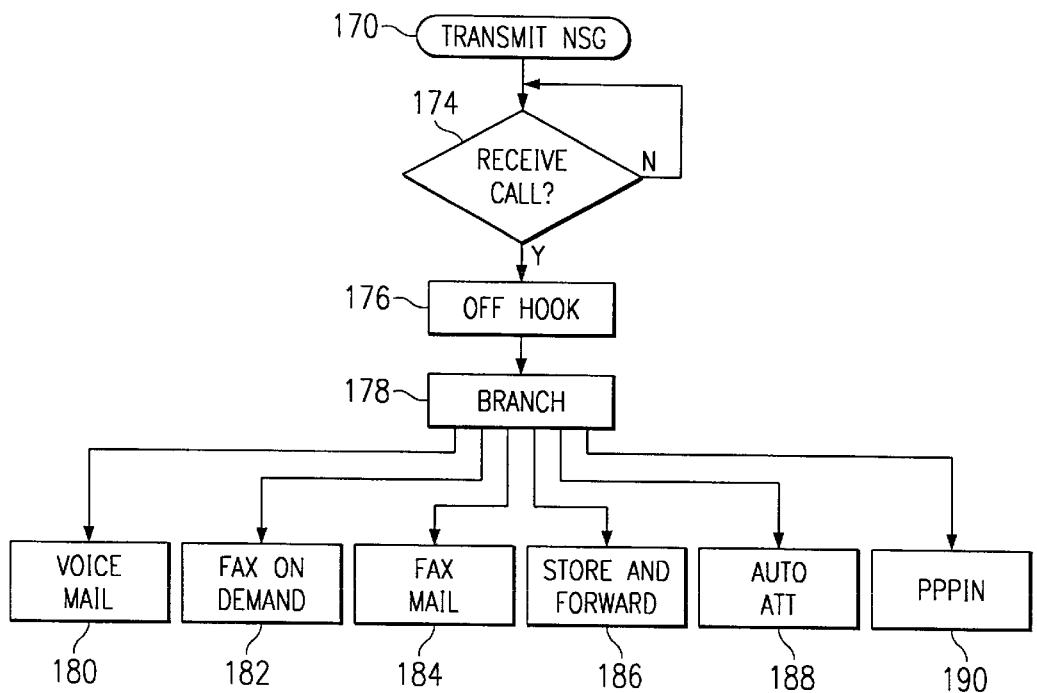
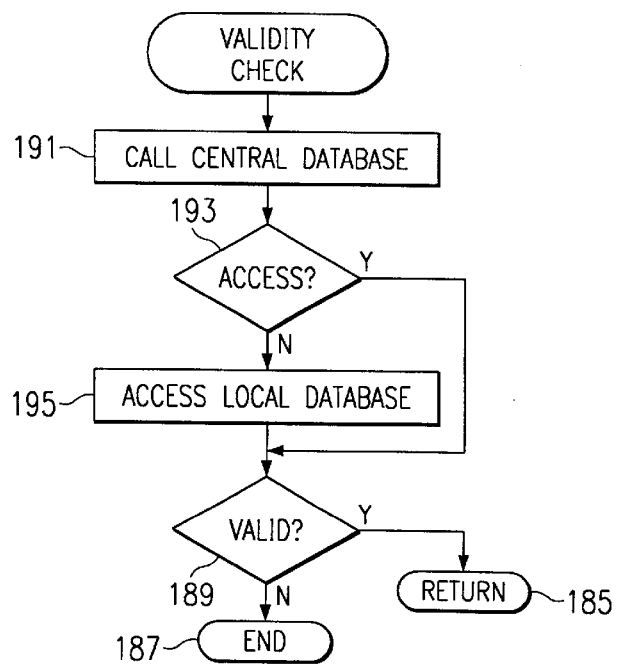

FACSIMILE NETWORK

This application is a Continuation of application Ser. No. 08/803,898, filed Feb. 21, 1997, U.S. Pat. No. 6,256,115 B1, issued Jul. 3, 2001.

TECHNICAL FIELD OF THE INVENTION

The present invention pertains in general to facsimile networks and, more particularly, to a network for allowing a fax transmission at an originating end to be transmitted to a destination facsimile machine through the network.

BACKGROUND OF THE INVENTION

Facsimile systems have seen increased acceptance in recent years and, in fact, have become a staple of the business community. In the early days of facsimile systems, some difficulties arose due to incompatibilities of the various systems. Even though one owned a facsimile system, there was some doubt as to whether a facsimile transmission could be completed to another system manufactured by a different manufacturer. This problem was somewhat alleviated when the standards were developed, one of those standards being the Group II standard.

Facsimile protocols are generally comprised of header information that is transmitted to a destination fax followed by an image, this typically being a bit-map image. However, prior to transmitting the header and images, it is necessary for a facsimile machine to negotiate a communication link with the destination facsimile machine. This is typically achieved to some type of hand-shaking. With Group II fax protocol, all too often the originating facsimile machines fail to even negotiate a communication link with the receiving facsimile machine.

When the Group III protocol was introduced in the mid-1980's, the use of facsimile machines saw a rapid increase in use. This was due to the fact that the Group III protocol not only was backward compatible with Group II, but it enabled a high level of standardization to occur in the industry. Typically, a Group III facsimile has associated therewith a handshake protocol that allows the two facsimile machines to determine their combined speed of operation and then transmit the images at that determined or negotiated speed. This is an interesting aspect of the facsimile machine, in that facsimile machines are typically rated at 14.4 Kbs, but this is their maximum speed. All too often, due to noise on the phone line, etc., the facsimile machines will default down to a slower speed. Typically, they initially try to effect the communication link at 9,600 Kbs and then drop to 4,800 Kbs, then 2,400 Kbs, 1,200 Kbs, and so forth, until an error free speed is reached. It is feasible with very noisy lines that a facsimile system may communicate at as low a baud rate as 300 Kbs. However, once an acceptable noise-free communication link can be maintained, then the image is transmitted at that speed, with both the source and destination adjusting their speed to the same speed.

In a Group III fax, the transmission of the image over the negotiated transmission link will consist of first transmitting the header and then all of the pages in the original facsimile document as a single job. Typically, there is an End of Page (EOP) command sent at the end of each page and then an End of Job (EOJ) command sent at the end of the job. During transmission, there are various error correction algorithms utilized to correct the data when it is transmitted, but some applications of the Group III fax has one disadvantage in that if the last page is not received correctly by a receiving fax, it does not provide an acknowledgment to the sending fax that it has received the entire job and the sending fax may interpret this to require a re-send operation, wherein the entire document is re-sent. For small jobs that are only one or two pages long, this is not a problem. However, for large jobs in excess of two hundred pages, this can be quite time consuming. The time consuming aspect is, of course, the time it takes to transmit a single page.

Transmission of an image over a facsimile connection is facilitated by first converting the image into a bit-mapped image via scanning of a hard copy of the document or converting a print job in a computer directly to the image, and then transmitting the individual bits as they are scanned or generated in a serial manner. However, this transmission of images is time consuming, especially if the image includes a lot of dark areas. One solution to this has been to actually transmit the data file prior to transforming it into an image. For example, one system that has achieved this is referred to as the Microsoft Exchange Server®, which is an operating system for messaging and file sharing. The purpose of this system to alleviate the necessity to transfer a document into an image prior to transmission to a remote site. It is not the conversion into the image that is time consuming but, rather, it is the transmission of the image information. Further, on the receiving end, the image information is not readily translated into a data file that can be manipulated. For example, if a destination user desired to transmit a contract which basically comprised an ASCII file, the procedure is to convert it first into an image and then transmit the image to the destination system. Once the destination system receives this image, it must be printed out from a facsimile machine or, alternatively, it can be imported into a computer program which can then either print the image out on a standard printer or store the image. However, once the image is received, it is not in a useable form to allow modification of the document itself. With the digital transmission systems, the file itself can be transmitted without first converting it into an image. However, all facsimile systems that exist at present require conversion of a file into an image as it would appear in a printed document and then transmission of this image. This can be facilitated by fax modems that directly convert a file into an image while using a scanner, the scanner being the more conventional approach.

SUMMARY OF THE INVENTION

The present invention disclosed and claimed herein is a method and apparatus for transmitting a fax from an originating fax machine to a destination fax machine. The system includes a first network for receiving a fax transmission that is routed thereto by the fax source. The fax source is operable to generate the fax transmission by assembling the information into an appropriate fax transmission and transmitting it over the first network. A buffer node is interfaced with the first network for receiving the fax transmission therefrom. The buffer node includes a buffer storage area for storing at least a portion of the received fax transmission. It also includes a fax transmission device for initiating a fax connection over a second network to the destination fax system. A fax delivery system then delivers the received fax transmission at the buffer node to the destination fax system. A status device at the buffer node is operable to determine the status of the fax delivery by the fax delivery system to the destination fax system. A status feedback device then forwards the status information to the fax source through the first network during the delivery operation of the fax transmission to the destination fax by the fax delivery device. The fax source has associated therewith a storage area for storing the received status information.

In another aspect of the present invention, the first network includes a public switched telephone network (PSTN) and the fax source includes a fax system that is operable to send a fax transmission over the PSTN in a format compatible therewith. The first network includes a global data network interfaced with the buffer node. An intermediate node is provided for interfacing with the PSTN and receiving the fax transmission thereover. A translation device at the intermediate node is operable to transmit the received fax transmission for a protocol compatible with the PSTN to a protocol compatible with the global data network. The intermediate node includes a compression device for compressing the translated information prior to transmission to the buffer node. The buffer node further includes a decompression device for decompressing the received fax transmission. Further, the intermediate node can also encrypt the translated information prior to transmission to the buffer node. This requires the buffer node to then include a decryption device for decrypting the received transmission.

In yet another aspect of the present invention, the fax transmission device is operable to initiate the fax connection prior to receipt of all of the received fax transmission by the buffer node. This initiation operation can have a length of time that is variable.

In a further aspect of the present invention, the fax delivery device has associated therewith a delay device for delaying the delivery of select portions of the fax transmission during transmission thereof to the destination fax system by the fax delivery device. This delay device includes an insertion device for inserting information within the facsimile transmission during transmission thereof to increase the length of the facsimile transmission over that of the received facsimile transmission by the buffer node. In this manner, the facsimile transmission can be modified during transmission thereof to the destination fax system.

In a yet further aspect of the present invention, the network includes a central network having multiple paths for transmitting data between remote locations with the transmission path of the data from a first point to a second point over the network being determined by the central network. A plurality of network nodes is provided to interface with the central network and are disposed at remote locations. Each of the network nodes has a PSTN interface for interfacing with a public switch telephone network (PSTN) that is local to each of the nodes. The interface is operable to transmit and receive fax transmissions thereover. The network interface device interfaces with the central network and then transmits and receives network transmissions thereover. A receive/transmit device is provided for communicating with a fax device that is connected to the PSTN and is interfaced through the PSTN interface to receive facsimile transmissions therefrom and transmit facsimile transmissions thereto. The fax receive/transmit device is operable to receive destination information from the fax device defining the address of a destination fax device and the fax receive/transmit device is also operable to effect a transmission of the fax in accordance with a stored destination address of a fax device associated with the PSTN to which the receive/transmit device is interfaced. A buffer is provided at each of the nodes for storing at least a portion of the received fax transmission by the fax receive/transmit device. These are then converted from the protocol associated with the received fax to a predetermined network format during a transmission operation and from the network format to the fax format during a receive operation from the central network. A network transmit/receive device is provided for transmitting network information converted by the conversion device over the central network through the network interface device and also for receiving fax transmissions from the central network through the network interface device. A routing device is provided at each of the nodes for determining a route over the central network in one of the multiple paths associated therewith, which routing determines which one of the nodes other than the originating one of the nodes is to receive the network information. The routing device is operable to establish a communication link to the other of the nodes for transmission of network formatted information over the established communication link.

BRIEF DESCRIPTION OF THE DRAWINGS

For a more complete understanding of the present invention and the advantages thereof, reference is now made to the following description taken in conjunction with the accompanying Drawings in which:

FIGS. 2a–2c illustrates a more detailed diagrammatic views of the network of FIG. 1;

FIG. 4 illustrates a block diagram of an NSG;

FIG. 7 illustrates a flowchart depicting the operation in the NSG for transmitting a fax;

DETAILED DESCRIPTION OF THE INVENTION

Figure 1:
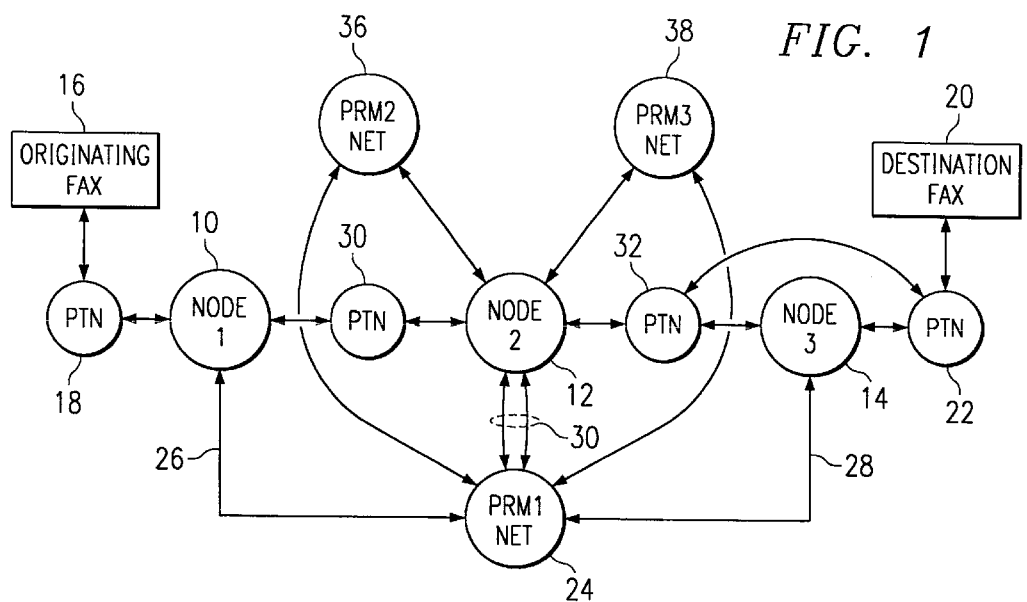
FIG. 1 illustrates a top level view of the network.

Referring now to FIG. 1, there is illustrated a diagrammatic view of the network that operates in accordance with the present invention. As will be described in more detail hereinbelow, the network is comprised of a plurality of nodes which act as an interface between facsimile systems at remote sites over some type of global network utilizing digital transmission of information wherein facsimile image information is converted to a proprietary digital format for transmission over a worldwide network and then conversion back into the image information and subsequent transmission to a destination facsimile machine. The system as depicted in FIG. 1 is an example and is comprised of a plurality of nodes, a node 10, a node 12 and a node 14. The node 12 will be referred to as the central node, and node 10 and node 14 will be referred to as remote nodes.

Node 10 is associated with a destination fax machine 16, in this example, through a public switched telephone network (PSTN) 18. Similarly, the node 14 is associated with a destination fax (previous was originating) machine 20 through a PSTN 22. Although only two facsimile machines 16 and 20 are illustrated, it should be understood that multiple facsimile machines are accessible by the system of the present invention, it only being necessary that the fax machine is accessible by any one of the nodes 10–14 through some type of communications network such as a PSTN.

Node 10 is interfaced to a primary network 24 through a communication link 26. Similarly, node 14 is interfaced with primary network 24 through a communications link 28 and node 12, the central node, is interfaced through the network 24 through a plurality of communications links 30, it being noted that any number of communication links can exist between the primary network 24 and the nodes 10 and 14.

The primary network 24 is a global network which is often referred to as the "Internet". This is not made up of a single central hub but, rather, is made up of a large number of service providers that utilize any number of paths to transfer data from one location to another location. Once a user has accessed a given destination node on the server, the network will define how the information is transported. This is done in many different ways and is well known technology. The primary network of 24 could be realized with existing data and voice networks or, in general, with any type of dedicated data/voice network.

In addition to interconnecting to each other through the network 24, each of the nodes 10–14 can interface with each other through the PSTN. As illustrated in FIG. 1, node 10 interfaces with node 12 through a PSTN 30 and node 14 interfaces with node 12 through a PSTN 32. Additionally, the nodes 10 and 14 are illustrated as only being able to access the primary network 24. However, node 12 has additional functionality and is able to interface with other networks that, in general, comprise part of the overall primary network 24 but are separate therefrom in respect to how they interconnect. The networks to which node 12 is illustrated as being interconnected with are a secondary primary network 36 and a tertiary primary network 38. These in general are other service providers that provide a portion of functionality of the overall primary network 24 but, which are not accessible by the nodes 10 and 14. For example, if node 12 had difficulty in interfacing through the communications links 30 to the primary network 24, it would then only be necessary to go to one of the secondary or tertiary networks 36 or 38, respectively, in order to effect a communication link with the primary network 24.

As will be described hereinbelow, the nodes 10 and 14 are usually disposed in the locale of the associated PSTNs 18 and 22. This allows essentially a "local" interconnect to be made to the respective one of the facsimile machines 16 and 20. A facsimile transmission will be achieved in the following manner in one exemplary embodiment. The originating fax 16 will dial the telephone exchange of the node 10 through the PSTN 18. Once a connection has been made, then the facsimile transmission will be effected between the originating fax 16 and the node 10 in a conventional manner and at the speed negotiated between the originating fax 16 and the node 10. As will be described hereinbelow, a "dialer" may be attached to the output of the originating fax 16, which dialer will perform the necessary call routing and dialing functions and even attach headers, etc., to the fax for use by the node 10. Without the dialer, the user must effect the connection with the node 10 through the PSTN 18 and then manually inputting the required information in response to voice prompts from node 10. It is noted that the dialer does have the capability to actually determine if it is more economical to route the fax transmission over only the PSTN 18 and bypass the network completely, this occurring in such connections as local calls.

Once the fax transmissions are received at the node 10, node 10 then determines how to transmit these fax transmissions to the destination fax. It in effect will function as an elastic buffer. It will typically do this by routing the buffered fax transmissions through the primary network 24 to the node 14 in a compressed and encrypted format. However, it can also take other paths through node 12 which will then relay it to node 14. Additionally, there is a path provided for PSTN 32 to PSTN 22 to bypass node 14 if node 14 is unavailable, this being an available option to the node 12, which protocol will be described hereinbelow.

During the transmission of the fax from node 10 to either of the nodes 14 or 12, the fax transmission is converted into a different format and is no longer in the image format that is normally transmitted by the originating fax 16. This is a proprietary protocol that allows the nodes 10–14 that are part of the system to converse with each other through the primary network 24.

Each of the nodes 10–14 has the versatility to determine routing of the fax transmission to the destination fax 20 such that different routes can be taken. Of course, the fax transmission could be sent directly over the PSTNs, but this would defeat the entire purpose of the network. Rather, it is important that the network, in whole or in part, be utilized to contact another node in the system. The reason for this is that one node, for example node 10, may not have access through either the primary network 24 or through other routes to the node 14 by which to transfer the information. Therefore, the node 10 may contact the intermediate node, node 12, through the primary network 24 in order to effect the transfer. However, node 12 has more resources available to it and is more capable of making the transfer to the node 14. Therefore, node 10 would receive the fax transmission, forward it in a different protocol to node 12 which would then route this fax transmission to node 14. However, node 12 could alternately directly contact node 14 through the PSTN 32 to the PSTN 22. However, the preferable method is to transfer the information to node 14. Node 14 will then take upon itself the task of transmitting the fax transmission in an analog manner to the destination fax 20 in a conventional manner. Of course, the transfer rate from the original fax 16 to node 10 does not dictate the transmission rate of the fax from node 14 to the destination fax 20, since node 14 can negotiate its own communication link and speed.

As an example, consider that the originating fax 16 is in Bangkok, Thailand, and the PSTN 18 is the local PSTN in Thailand. Also, node 10 would also be located in proximity to Thailand, such that it would handle all out-going faxes in the system that would go through PSTN 18. As noted above, it is only necessary to have a dialer that will receive a call from the fax 16 and route it to node 10 with the appropriate header information attached thereto or to manually make this connection. Consider also that the destination fax 20 is located in London and the PSTN 22 is a local PSTN in the United Kingdom, as well as the node 14 being located in the United Kingdom. It is then only necessary for the node 10 to determine how best to route the information to node 14 through the primary network 24. This can be done directly by effecting a connection through the primary network 24 to node 14, then transferring the information thereto. However, it may not be possible to connect directly to node 14 through the primary network 24, due to some limitations. In this situation, the node 10 may make the decision to forward the information to node 12, wherein node 12 would then select possibly a different network such as secondary network 36 to route the information to node 14. This is primarily due to the fact that node 12 may have more resources at its disposal. Additionally, it may be a less expensive route that can be selected by node 12. However, once the information is transmitted to the node 14 by whatever route, node 14 then takes over the task and merely utilizes the primary network 24 to return status signals to node 10. The important aspect to note is the fact that whatever route is chosen, the network itself configures itself to select the route based upon criteria such as cost, network availability, etc.

In general, it is desirable to configure the network such that the fax transmission is sent virtually real time with only the network delays associated therewith. These network delays do not affect the cost, as the cost for transmitting the message through the PSTN 22 will be a function of the amount of time for the data to be transmitted over the PSTN line. Transmission over the primary network 24 is certainly priced significantly lower than that for the local PSTNs and the long haul PSTNs.

Referring now to FIGS. 2a–2c, there are illustrated more detailed diagrammatic views of the system of FIG. 1. In the diagram of FIG. 2a, there are illustrated two sources of facsimile transmissions, a fax machine 40 and a scanner 42. In the fax machine 40, the information is a conventional manner that operates by dialing a selected destination number and then faxing the image information in accordance with the protocol of the fax machine 40, this typically being a Group III protocol. This is output on a telephone interface 42 for input to a dialer 44. The dialer 44, as noted above, is operable to receive the outbound digits and then forward them to a Network Services Gateway (NSG) 46, this essentially being the heart of each of the nodes 10–14 described hereinabove. The dialer 44 will interconnect to a public switch network 48 to effect the communication link with the NSG 46. Again, as noted above, the transmission from the fax machine 40 through the dialer 44 and the public switch network 48 is achieved with a conventional facsimile transmission. It is noted that, although the dialer 44 is illustrated as being directly connected between the fax machine 40 and the PSTN 48, there could be a PBX disposed between either the fax machine 40 and the dialer 44 or between the dialer 44 and the PSTN 48. Also, the functionality of the dialer could be integrated into a PBX or directly into the fax machine 40.

The NSG 46 is then operable to convert the received document in the form of the image and the header and route it to a second NSG 49, a destination NSG, through the Internet, which is represented by a block 50, this being essentially the primary network 24 of FIG. 1. The NSG 49 is the destination NSG, which then is operable to utilize an optional SUMMA4 switch 52 for output on a T1 line 54 through a PSTN 56 for connection to a destination fax machine 58. Although the fax machine 58 is represented as a conventional fax machine, it should be understood that the fax machine represents anything capable of receiving a facsimile transmission of image information. This could be a computer with a fax modem disposed therein.

In addition to transmitting directly from the fax machine 40 to the fax machine 58, through NSGs 46 and 49, there is also provided a fax management system (FMS) 60 which is operable to receive the scanned-in images from the scanner 42 and manage the transmission thereof This is facilitated by transferring the facsimile information through the PSTN to an Internet service provider (ISP) 62 (which can be associated with each of the nodes and the NSG 46) which is then operable to transfer this information out through the Internet in the same way that the NSG 46 transfers information. The protocol for the information transmitted from the ISP 62 and from the NSG 46 is the same, such that the NSG 49 treats this information the same and it is all transmitted through the Internet 50.

Referring now to FIG. 2b, there is illustrated an alternate diagrammatic view illustrating an alternate routing. In the illustration of FIG. 2b, there are illustrated the fax machine 40 and dialer 44 and an additional local fax machine 41. The fax machine 41 is basically configured as a receive-only fax machine. In the routing operation, a fax is generated by the fax machine 40 and processed through the dialer 44. The dialer 44, as described above, routes this information directly to the NSG 46 for handling of the call. The NSG 46 recognizes that the destination of the fax generated by the fax machine 40 is to the fax machine 41, which fax machine 41 is connected to the PSTN 48, which PSTN 48 constitutes a local call. Rather than utilizing the resources of the system, the NSG 46 merely recognizes this as an in-country call and routes it back through the PSTN 48 to the fax machine 41. This is illustrated by a route 43 back to the PSTN 48. If it is an international call, then it will be routed along a path 45 to the Internet 50, this being the preferred path for international calls. Of course, it should be understood that the NSG 46 could actually route an international call through to PSTN 48, although this essentially defeats the purpose of the network. However, it is one alternative.

Referring now to FIG. 2c, there is illustrated yet another embodiment of the routing operation. In FIG. 2c, the alternative provided to the system allows either the FMS 60 or the fax machine 40, both originating facsimile transmissions, to forward faxes to either the fax machine 58 through the network or to the local fax machine 41. The FMS has a number of options available to it. The FMS 60 has the option of transmitting a fax to the system fax 40, which system fax 40 can operate as an originating source, to the local fax machine 41 or to the remote fax machine 58. The FMS 60 can route the facsimile transmission to the remote machine 58 either directly through the ISP 62 and the Internet 50 or through the NSG 46. Whenever it routes a fax to the remote fax machine 50, the preferred mode will be through the ISP 62 and directed to the Internet 50. Otherwise, it would have to contact the NSG 46 which would be a slower route and consume resources of the system. The NSG 46 could actually reroute this call to the fax machine 58, although this is not illustrated. What is illustrated is that if the FMS 60 desires to contact the fax machine 41, it can go through the ISP 62 and then to NSG 46. The NSG 46 has a local connection to the local PSTN 48 and can route the transmission back through the route 43 to the PSTN 48 and then to the fax machine 41 or even the fax machine 40. The NSG 46, in normal operating mode with respect to the local system fax machine 40, will receive calls therefrom and make two decisions. It will either route it to the path 45 for routing to the Internet 50 and subsequently to the remote fax machine 58, or to the local route 43 back to the fax machine 41.

It is noted that both the dialer 44 associated with the fax machine 40 and the FMS 60 have the ability to make decisions based upon the destination phone number. This decision allows the FMS 60 to route the call directly through the PSTN 48 without going through either the ISD 60 or the NSG 46, directly to either the fax machine 40 or the fax machine 41. Similarly, the fax machine 40 and the dialer 44 can route directly through the PSTN 48 to the fax machine 41, such that it is not necessary to go through the NSG 46.

Figure 3:
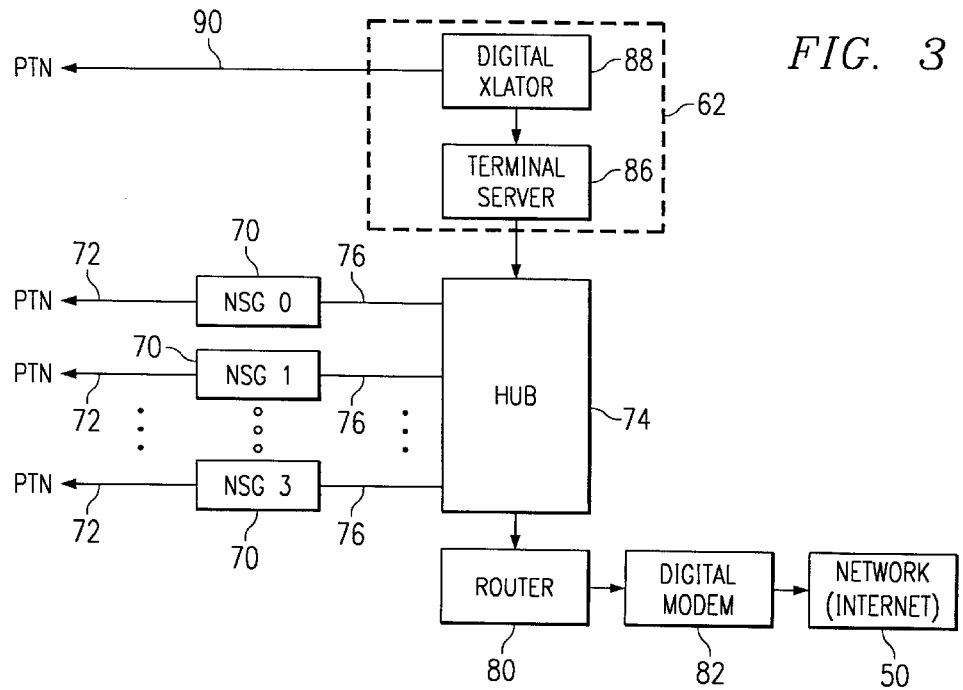
FIG. 3 illustrates a block diagram of a node.

Referring now to FIG. 3, there is illustrated a block diagram of each of the nodes 10–14. There are provided at the node, a plurality of NSGs 70, each having an interconnection 72 to the PSTN associated therewith, which in the preferred embodiment comprises a number of trunk lines, either analog or digital. Additionally, a central hub 74 is provided, which is essentially a computer, which interfaces with the NSG 70 through network cables 76, which in the preferred embodiment are Ethernet cables. The hub 74 therefore constitutes the center of a local area network (LAN) or wide area network (WAN). The hub 74 is operable to interface with a router 80, which determines in what order the incoming traffic is forwarded to the Internet 50. This is facilitated by converting the information to a digital format with a proprietary protocol and outputting this through a digital modem 82 to the network 50. The conversion of incoming faxes received at each of the NSGs 70 via the PSTN interconnection 72 is facilitated by the particular NSG 70. The NSG 70 then interconnects with the network 50 through the hub 74. However, the functionality for each of the NSGs 70 is contained within that NSG 70. The hub 74 is merely a network administrator. Alternatively, the NSG 70 could be designed to directly interface with the network 50.

In addition to the NSG 70, the FMS 60 is operable to interface with a terminal server 86 through a digital translator, such as a digital modem 88, from a line 90 that is interfaced with the PSTN. This could be either a digital data transmission path via the PSTN or a standard voice path. The digital translator 88, the terminal server 86, the hub 74, the router 80 and the modem 82 form the ISP 62. This interfaces directly with the hub 74, such that the FMS 60 can interface directly with the hub 74 without having to go through an NSG 70. As such, the FMS 60 will then transmit the information in a digital format that is capable of being received by the destination NSG, NSG 49 in FIG. 2.

Referring now to FIG. 4, there is illustrated a block diagram of the NSG. The NSG has at the center thereof a CPU 100 which is a general computer and having associated therewith a display 102, a memory 104, an input device such as a keyboard 106 and any other type of input device 108. The CPU 100 is operable to interface with either the PSTN or the local area network (LAN). The interface with the PSTN is facilitated with a fax modem 110, which is a conventional device. In addition, there is provided a voice card 112 which is operable to generate voice prompts for transmission over the PSTN. This voice card 112 is a Dialogic B/41D, a conventional device. In general, this is provided for generating voice prompts and receiving DTMF digits, as will be described hereinbelow. The interface to the LAN is effected with a network card 114 for interfacing with the Ethernet cable 116. This effects an Ethernet connection.

Figure 5:
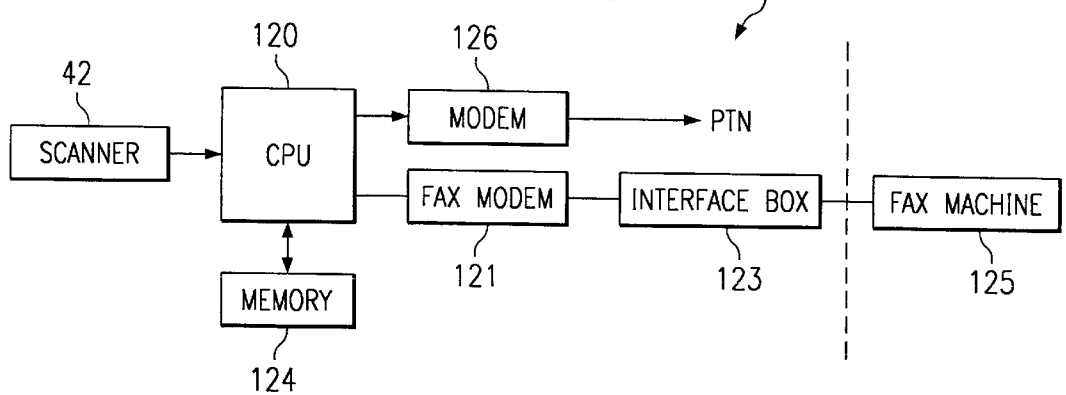
FIG. 5 illustrates a block diagram of the FMS.

Referring now to FIG. 5, there is illustrated a block diagram of the FMS 60. In general, the FMS 60 is a general computer comprised of a CPU 120 and memory 124. A modem 126 is provided for interfacing with the PSTN, this modem typically being an analog or digital modem, depending upon the interface with the PSTN. The CPU 120 interfaces with the scanner 42 to receive information therefrom. In addition to the scanner 42 for allowing input, a conventional fax machine 125 could be accommodated by the FMS 60 and is a separate part thereof. The fax machine 125, since it is a conventional machine, requires interface to a telephone line. This is due to the fact that it includes, as an integral part thereof, a fax modem. As such, in order to interface with the FMS 60, the FMS 60 must essentially emulate a fax machine and the PSTN interface. This, of course, is a conventional operation and is facilitated by a general purpose fax modem 121 that is disposed in the appropriate slot in the CPU 120, this being a conventional interconnection. The fax modem will then interface with an interface box 123. The interface box 123 basically emulates a telephone system. This allows the fax machine 125 to be input to the interface box 123 such that the interface box 123 will emulate battery feed, dial tones, on hook and off hook conditions to both the fax modem 121 and the fax machine 125. Therefore, the fax machine 125 can then merely initiate a call to the fax modem 121 through the interface box 123 by dialing the desired destination number or some false number that the interface box 123 will essentially ignore. Once the interface box 123 has received the indication that the fax machine 125 has gone off hook, it will then access fax modem 121 by initiating a call thereto. Fax modem 121 will then go off hook and interface box 123, after receiving the dummy digits by fax machine 125, will then make the connection and allow the fax modem 121 to directly communicate with fax machine 125 just as if it were talking through a public switch telephone network.

Figure 6:
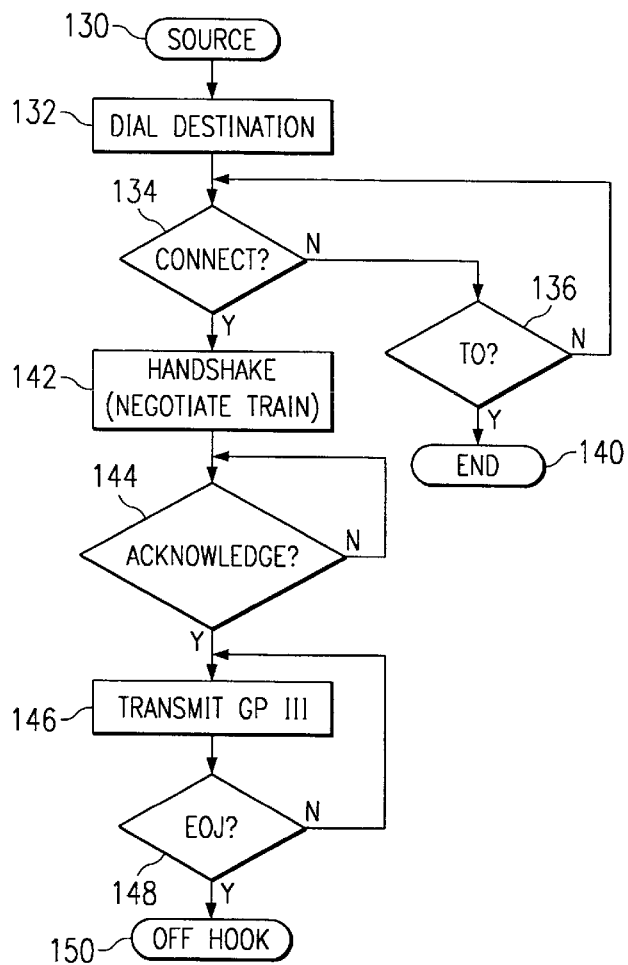
FIG. 6 illustrates a flowchart depicting the operation of the originating facsimile machine.

Referring now to FIG. 6, there is illustrated a flowchart depicting the operation of generating a fax at the source facsimile machine. The program is initiated at a block 130 and then proceeds to a function block 132 wherein the destination number is dialed. The program then flows to a decision block 134 to determine if the destination has gone Off Hook and responded to the carrier tone generated by the originating fax. If not, the program will flow along an "N" path to a time-out decision block 136 which will perform a time-out operation after a predetermined period of time and route the program to an End block 140. If not, the program will loop back around to the input of decision block 134. Once a connection has been made, the program will flow to a function block 142 to negotiate the interconnection. This is facilitated with various handshake signals followed by a transmission of identification information back and forth. This handshake determines or negotiates the speed of transmission, etc. Initially, the fax machine will attempt to make the connection at the highest speed. However, if the line is noisy and a significant number of errors occur, then the speed will be dropped until an acceptable communication speed is achieved. At this time, an acknowledgment signal will be received from the destination fax as indicated by a decision block 144. The program will then flow to a function block 146 to transmit the fax transmission as a Group III fax and then to a decision block 148 to wait for an End of Job (EOJ) signal. However, it should be understood that any type of facsimile protocol could be utilized. The program will loop back around to the input of function block 146 until the EOJ command is received, at which time the program will flow to a block 150 to go off Hook.

Figure 6A:
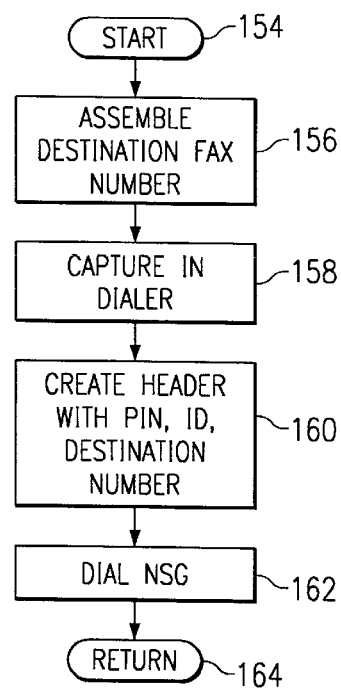
FIG. 6a illustrates a flowchart depicting the operation of dialing the destination.

Referring now to FIG. 6a, there is illustrated a flowchart depicting the operation of dialing the destination. The program is initiated at a Start block 154 and then proceeds to a function block 156 wherein the fax essentially assembles the destination fax number. This is the dialing string that a fax machine will typically transmit. This is transmitted to the dialer 44 which then captures this information, as indicated in a function block 158. The dialer 44 will then create and store information for later transmission to the NSG which is comprised of a destination number transmitted by the fax machine. This is indicated in a function block 160. The dialer 44 will then dial the NSG number, as indicated by a function block 162, which operation can be initiated before completion of the receipt operation of the destination number. Additionally, the dialer can decide to route the call to a different destination as a function of the received destination information. The system can also process various error conditions such as a busy signal, etc., and re-route the call or initiate a re-dial procedure. The program will then return, as indicated by a return block 164. In general, the dialer 44 merely provides a routing operation, which is similar to the operation of conventional auto-dialers, and then interfaces with the NSG to provide such information as the destination number and personal identification numbers (PINs).

Referring now to FIG. 7, there is illustrated a flowchart depicting the operation of transmitting information from the NSG over the network. The flowchart is initiated at a block 170 and then flows to a decision block 174 to await for a call from one of the outlying dialers. Once this is received, the program will flow to a function block 176 to go off hook and receive the information. At this point, the system will go into a branch operation 178 to determine which operation is being selected. There are numerous operations from the branch, they being a voice mail route 180, a fax on demand route 182, a fax mail route 184, a store and forward route 186, an auto attendant route 188 and a fee-paid PIN route 190. Each of these is accessed by dialing a particular DID number.

Figure 8:
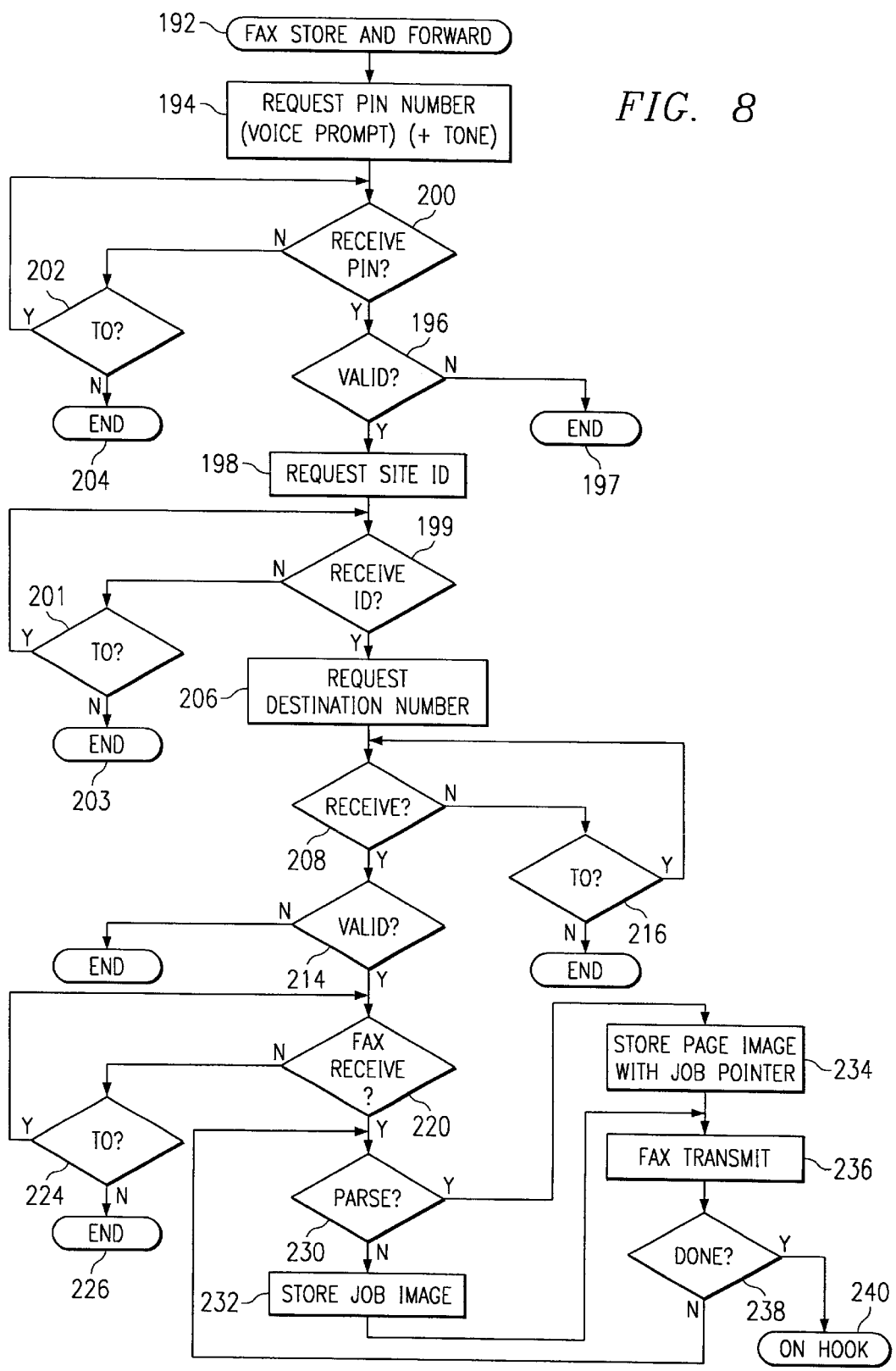
FIG. 8 illustrates a flowchart depicting the store and forward operation for transmitting a fax.

Referring now to FIG. 8, there is illustrated a flowchart depicting the store and forward operation 186, which is initiated at a block 192 and then proceeds to a function block 194. In function block 194, the NSG requests a PIN number from the source, which with a facsimile machine would typically be the dialer. This request can be either a voice prompt or it can be a tone or a combination of both. Typically, the voice prompt will be output in addition to the tone to facilitate manual entry of information in the absence of the dialer 44. The dialer 44, of course, will recognize the tone.

After the PIN number has been requested, the program will flow to a decision block 200 to await the receipt of a PIN number. The program will flow along the "N" path to a time-out decision block 202 until either the PIN is received or a time-out occurs. If a time-out occurs, the program will flow to an End block 204. When the PIN number is received, the program will flow the "Y" path to a decision block 196 to determine if the PIN is valid. This verification process is performed in two ways as illustrated in the flowchart of FIG. 8a. The system first attempts to connect to a central database at a central location which may be remote from the location of the present NSG, illustrated by a block 191. If it is able to access the central database, as indicated by a decision block 193, it will then look up in the central database the PIN for verification purposes. If it cannot access the central location for some reason, it will then access a local database which has stored therein PINs for that locality and verify the received PIN, as indicated by a block 195. The program of FIG. 8 will then perform a validation operation, as indicated by a decision block 196. Once the PIN has been validated, the program will flow along a "Y" path, in the flowchart of FIG. 8, to a function block 198 to request a site ID. This site ID is the ID of, for example, one of a single customer's multiple machines that have access to the system. The program will then flow to a decision block 199 to await the receipt of the site ID, the program flowing around a loop along the "N" path and through a time-out decision block 201 back to the input of the decision block 198 until the ID is received. At this time, the program will flow along the "Y" path to a function block 206. Otherwise, the time-out will occur in block 201 and the program will flow to an END block 203.

The function block 206 indicates the step of requesting the destination number and then the program flows to a decision block 208 to wait for the receipt of the destination number. The program will flow along the "N" path back to the input of block 208 through a time-out block 210 until either the destination number has been received or the time-out has occurred, the program flowing to an End block 212 if the time-out occurs. When the destination number is received, the program flows along a "Y" path to a decision block 214 to determine if the destination number is valid.

Once the destination number has been compared to an internal database at the NSG (or to a database accessible by the NSG over the primary network 24, thus utilizing the flowchart of FIG. 8a), and has been determined to be valid, the program will flow along a "Y" path from decision block 214 to a decision block 220 to determine if a fax has been received. Since the operation of transmitting a fax is one that does not necessarily require an acknowledgment, the fax will automatically be sent after the interconnection has been negotiated. This is a real time operation. Therefore, the program will sit in a loop at the decision block 220 which passes through a time-out decision block 224 until a fax has been received or a time-out operation has occurred. If a time-out operation occurs, the program will flow to an End block 226.

Once the fax has been indicated as being in a receive mode, this fax will be received, as indicated by a function block 228. It is noted that, when the fax is received, it is received a page at a time. As it is being received, the system can recognize what is being received and that a page has been received due to the receipt of an EOP command. The program will flow to a decision block 230 to determine if a parse operation is to be performed. The parse operation is one that divides the job into pages or, alternatively, does not parse and maintains it as an integral job. If the parse operation is not selected, the program will flow to a function block 232 in order to store the job image. However, if the parse operation is selected, the program will flow along the "Y" path to a function block 234 wherein the page image will be stored with a job pointer. As such, every page image will be associated with a given job such that the job can be recreated at a later time. Although not described in the flowchart of FIG. 8, it should be understood that the facsimile could be made in such a way that only page buffer storage is required and the entire job would not be stored.

Once the job has been parsed or stored as a job, the program will flow from function blocks 232 or 234 to a function block 236 in order to initiate a fax transmission to another NSG. The program will then flow to a decision block 238 to determine if the transmission is complete. If not, it will flow back to the input of decision block 230 and, if so, it will flow to a function block 240 to go off hook and essentially disconnect from the network.

Figure 9:
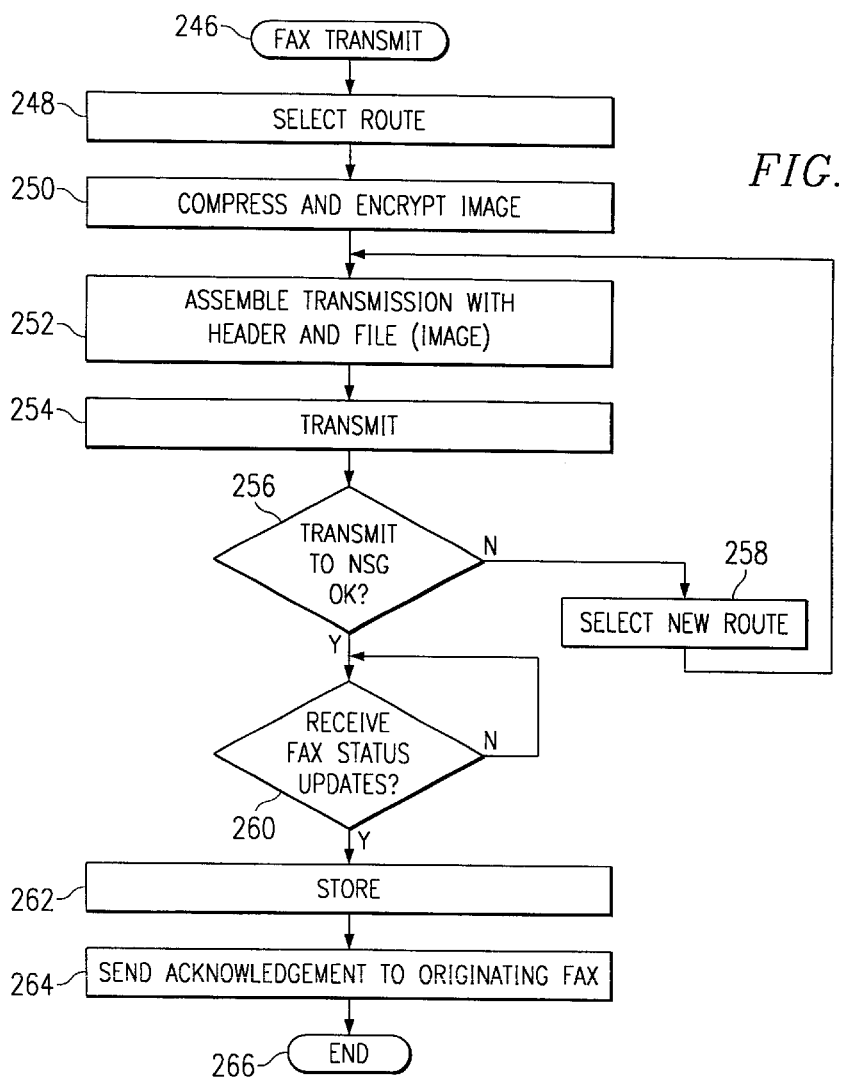
FIG. 9 illustrates a flowchart depicting the operation of transmitting the fax within the store and forward operation.

Referring now to FIG. 9, there is illustrated a flowchart depicting the operation of the fax transmission between NSGs, as indicated by function block 236 of FIG. 8. The flowchart is initiated at a block 246 and then flows to a function block 248 to select the route. Since the NSG has received destination information for the particular fax job, it can look in a local table to determine how to best achieve this interconnection. If there is an NSG in the local PSTN dialing region of the destination number, it will attempt to select the route that will directly connect through the network, i.e., the Internet, to the local NSG. However, if there is no local NSG, it will then select an NSG that will provide the least cost fax delivery. For example, if a source in the United Kingdom desired to contact a destination fax in Indonesia and there were no NSG in Indonesia, it may be that a direct connection through the British telephone system would be prohibitive. Therefore, the NSG in the United Kingdom would forward the job to the NSG in a central location, for example, in the United States. At this central location, the resources available to that NSG will allow for a great deal of versatility in transmitting the fax to Indonesia. There may even be a situation where another NSG had a direct link to Indonesia which would make that the preferable NSG. This, of course, would be information that was accessible within the database associated with the NSG, i.e., a routing table. It is important to note that the advantage provided by such a routing is the fact that the images can first be translated from the facsimile format, i.e., the Group III format, to a proprietary digital, relatively high speed format for transmission over the network. Since the final transmission must be done over a standard Group III format, (noting that other formats are considered here) the system's primary goal is to transmit the encoded and converted information over the Internet to another location that has the capability of achieving the conversion back to and transmission of the Group III formatted facsimile in a more economical manner. Additionally, there are other aspects that are facilitated by buffering the job transparent to the original fax machine. This is to be compared with a true fax mailbox system wherein the facsimile is actually stored in a different location and then retrieved upon demand. This system, by comparison, will provide a temporary store and forward operation that provides the buffering or storage only for the purpose of translation and ensuring that the fax is routed through the appropriate networks, and the integrity of that fax transmission is maintained at the destination end.

After the route is selected, the program will flow to a function block 250 in order to compress and encrypt the image. This is typically achieved with two different techniques. The compression is achieved with an RSA encryption algorithm whereas the compression is done with a Dyna Zip algorithm. These are conventional algorithms. After compression and encryption, the program flows to a function block 252 in order to assemble the transmission with the header and the file image. The header contains all the information necessary for the destination NSG to handle the operation. It needs the file name, the PIN, the destination number, the IP address (Internet provider address) of the originating NSG and the file image. The program then flows to a function block 254 in order to transmit the assembled transmission to the destination NSG and then to a decision block 256 to determine if the transmission is acceptable. If not acceptable, the program will flow along an "N" path to a function block 258 in order to select a new route. This selection operation is primarily done due to the fact that the selected route selected in accordance with the database information has failed. Therefore, an alternate route must be selected, this also contained in the database. The program will then flow back to the input of the function block 252.

After the transmission has been completed, the program will flow from the decision block 256 along the "Y" path to a decision block 260 to wait for fax status updates. Although the originating NSG does not enter into the actual conversion from the compressed and encrypted file image to a Group III fax for transmission to the destination fax, the originating NSG maintains information as to whether the fax was successfully transmitted. The reason for this is that these updates can be returned back to the fax machine. These fax updates are basically information regarding each page that is transmitted. This is facilitated by the destination NSG transmitting a status signal back through the network to the IP address of the originating NSG. The originating NSG need only listen to the network to retrieve this information. Typically, the job number and IP address of the destination NSG will be associated with the transmission that the originating NSG is listening to. Once the updates are received and it has been completed, the program will flow along the "Y" path to a function block 262 wherein these updates will be stored. The program then flows to a function block 264 to send an acknowledgment to the originating fax, or alternatively, these can be stored and retrieved later by the user of the originating fax. The program will then flow to an End block 266.

Figure 10:
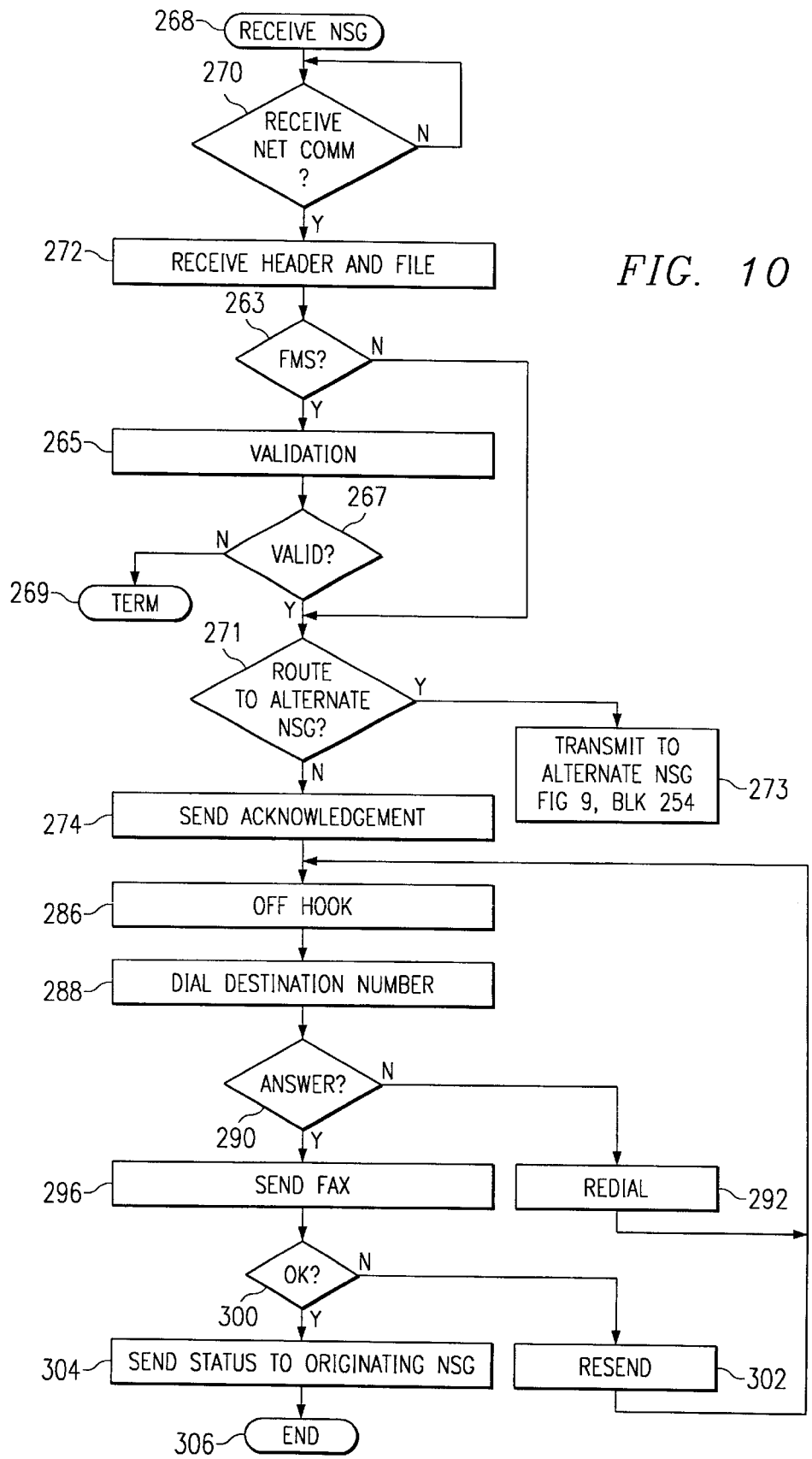
FIG. 10 illustrates a flowchart depicting the operation of receiving a fax at the NSG.

Referring now to FIG. 10, there is illustrated a flowchart depicting the operation at the receiving NSG, i.e., the destination NSG. This program is initiated at a function block 268 and then flows to a decision block 270 in order to determine if a net communication is being received. Until this is received, the program will flow along a "N" path back to the input to remain in a listening mode. When a net communication is received and directed toward that NSG, the program will flow along a "Y" path to a function block 272 in order to receive the header and file information of the assembled transmission that has been transmitted thereto.

The program will then flow through a decision block 263 to determine if the NSG has received the communication from the FMS 60. If so, the program will flow to a function block 265 to perform a validation operation, the validation operation noted hereinabove with respect to FIG. 8*a* wherein the system can go to the central location for validation of the IB of the transmitting FMS 4 to a local data base. The program will then flow to a decision block 267 to determine if the FMS is a valid system and, if not, it will flow through a termination block 269 and, if so, it will flow through a decision block 271. If the information was not received from an FMS, the program will flow along the "path" to the input of the decision block 271 bypassing blocks 265 and 267.

A decision block 271 determines whether the received communication is to be routed to an alternate NSG, ie, the receiving NSG is nothing more than a relay station. If so, the program will flow along a "Y" path to a function block 273 to transmit the information to the alternate NSG. This is indicated by the operation in the function block 254 FIG. 9. If the information is not to be routed to an alternate NSG, the program will then flow to a function block 274 in order to send an acknowledgment and then to a function block 276 to go off hook. The program will then flow to a function block 288 in order to dial the destination number of the fax to which the fax is to be sent. The program flows to a decision block 290 to determine if the destination fax has answered. If not, the program will flow along the "N" path to a function block 292 in order to enter a re-dial procedure. The re-dial procedure forces the system to go on hook and then returns to the input of function block 286 after a predetermined period of time. Of course, these re-dial procedures can take any form.

Once the destination fax machine has answered, the program will flow to a function block 296 to send the fax. This operation basically requires a conversion from the image format that has been received a Group III protocol, which is a conventional operation and utilizes the fax modem 110 in the NSG. After the fax has been sent, the program will flow to a decision block 300 to determine if the fax transmission has been successfully sent. If not, the program will flow along the "N" path to a re-send block 302 and then back to the input of the off hook block 286.

When the fax has been successfully sent, the program will flow from the decision block 300 to a function block 304 to send status signals back to the originating NSG via the Internet network. This operation is typically done during the transmission of the fax. For example, for each page that is sent and each step in the process, some status signals will be sent back to the originating NSG. Once the status signals have been sent, the program will flow to an End block 306.

Figure 11:
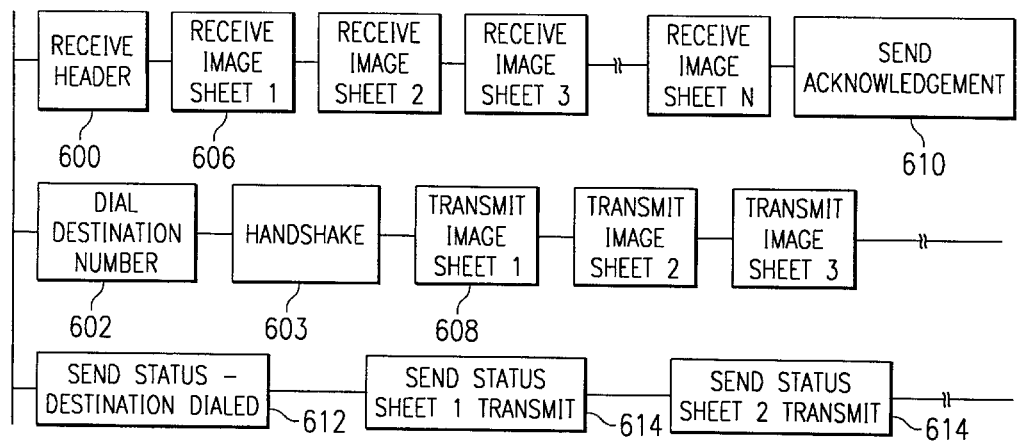
FIG. 11 illustrates a time diagram depicting the various time relationships between the operations.

Referring now to FIG. 11, there is illustrated a timing diagram illustrating what is referred to as a "overlap" operation. It can be appreciated that there is some time delay for transmitting a fax to an intermediate location and then reassembling the fax for transmission to the destination. The reason for this is that there is some time required to negotiate the communication link to a fax machine. Typically, the handshaking and negotiating operation can take between two to ten seconds. The network in the present system is one that attempts to make the fax transmission from the originating fax to the destination fax a transparent real time operation. It can be appreciated that the operation of sending a page of information from the originating fax machine to the originating NSG takes considerably longer than sending the compressed and encrypted data file from the originating NSG to the destination NSG. However, if a destination NSG must then contact the destination fax, it must again go through some type of negotiating operation to negotiate the communication link, this taking from two to ten seconds. Therefore, as soon as the destination and header information are received, it can be transmitted to the destination NSG and the destination NSG can then negotiate the communication link with the destination fax even prior to receiving the first page of information from the originating NSG, and at a potentially different speed than that of the originating fax machine transmission to the originating NSG. In this manner, before the originating NSG has forwarded the first sheet of the document to the destination NSG, an interconnection to the destination fax can be completed. Additionally, it should be noted that the originating NSG does not wait for the entire job to be received prior to sending the fax, it basically negotiates the interconnections through the network and sends the pages as they are received, with the encryption/compression operation taking place "on-the-fly."

In FIG. 11, there are illustrated three time lines, a first one for the receive operation, a second one for the operation wherein the destination fax is dialed and the third one for the return of status signals. When the destination NSG receives the header information, as indicated by a block 600, it immediately initiates a dial operation to the destination fax machine on the second time line at a block 602. The handshake and negotiating operation is then initiated, as indicated by a block 603, while the NSG at the destination end is receiving the first image, as indicated by a block 606. After the handshake is initiated, if the image has been received, it then is transmitted to the fax machine at the destination end, as indicated by a block 608. This continues until all sheets have been received, at which time the acknowledgment signal is sent back to the originating NSG, as indicated by a block 610. The images are buffered at the NSG on the destination end and the image is continually transmitted to the destination fax. On the third time line, it is noted that as soon as the header information is received, a status signal is sent that it has been received and the destination fax dialed, as indicated by a block 612. After each image is transmitted to the destination fax, a status signal is sent back, as indicated by status blocks 614.

Figure 12A:
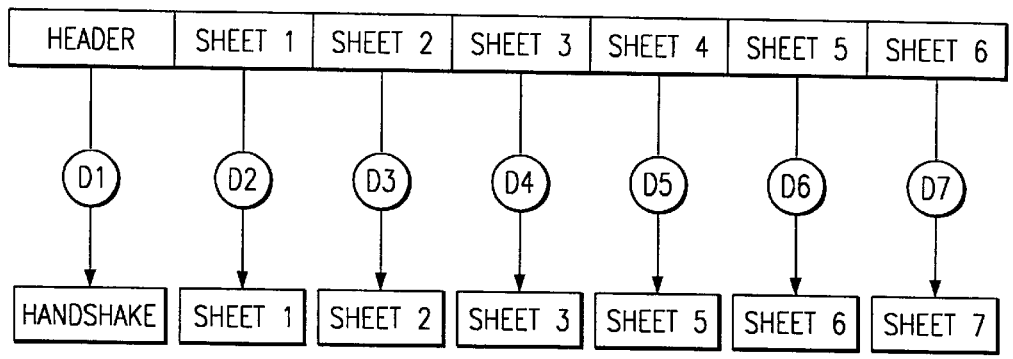
FIGS. 12a and 12b illustrate diagrammatic views of a time line for transmitting sheets.

Referring now to FIG. 12*a*, there is illustrated a time line depicting the delay between transmission of sheets. In the above-noted description of FIG. 11, the transmission of the fax occurs at substantially the same time. However, there may be situations wherein the receiving fax transmits at a much slower rate. In this condition, it is necessary that the transmitting NSG transmits the sheets at a slower rate than they were received. Therefore, there will be a delay in actually transmitting the sheets. This is indicated in FIG. 12*a* with various delays. For example, there will be a delay D1 between the receipt of the header and the transmission of the handshake. Sheet 1, of course, is illustrated as being received at a much faster rate than the handshake and possible negotiate a connection with the receiving fax. Therefore, the receiving NSG must then place a delay into the system before transmitting the first sheet. This is the case with all subsequent sheets. This is a dynamically determined delay that is determined as a function of system resources and needs. In the present example, this delay may be due to the fact that the receiving fax may receives at a slower speed or that there may be retries. Any number of reasons can be utilized for interspersing these delays. In any event, it can be seen that there is a determined delay between receipt of the fax and transmission thereof The delay in the transmission of the fax is provided by the processing unit operating in conjunction with the fax modem at the destination NSG. In general, a Group III fax protocol requires the transmission to be transmitted in a continuous and serial manner without interruption. However, there are certain inherent limitations in any transmission medium. Therefore, the Group III protocol provides for delays due to data that must be transmitted, problems at the transmission end, etc. In order to accommodate such problems, various time-outs are incorporated into the protocol. As such, if information is not flowing as expected to the receiving or destination fax machine, the Group III protocol will allow for some latitude in the reception time. However, a counter of some type will be initiated at some point in the process and, if the appropriate information is not received within that time-out, then the destination fax system will disconnect. By utilizing the available time within the time-out period, the transmission can be delayed up to and slightly less than the time-out period. As such, this provides a dynamic delay feature. The second way of creating a delay, of course, is to insert a blank page into the fax transmission. This type of situation would be utilized in the event that a fax transmission were initiated to the destination fax from the destination NSG prior to fully receiving the originating fax at the destination NSG. In the event that there were a problem and the data were going out faster than it were coming in, then a blank page could be dynamically inserted into the fax transmission. The insertion of the page could also be done for the purpose of inserting advertising information or the such into the fax transmission.

Another delay device that could be utilized is that in initiating the fax transmission. As noted above, it is necessary to dial a particular string through the PSTN that will initiate the call to the destination fax. All of the numbers in the destination phone number could be dialed with the exception of the last number. By holding onto the last number, then a slight delay could be provided in actually interconnecting to the destination fax. This will provide a variable delay in the initial handshake. Additionally, there are some time-out periods during the handshake operation that could be utilized. All of these features, when taken together, provide for different methods to perform such a delay.

Figure 12B:
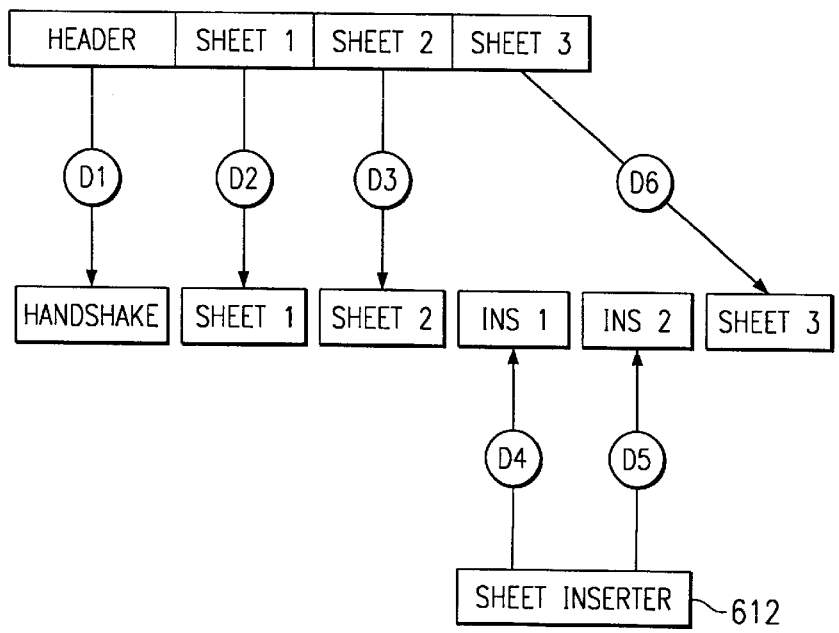

In FIG. 12*b*, there is illustrated an alternate embodiment wherein there are provided differing delays between sheets. The handshake, sheet 1 and sheet 2 are transmitted in a similar manner described above with respect to FIG. 12*a*, i.e., in a sequential manner. In this illustration, a handshake is transmitted followed by a transmission of sheet 1 after delay D2 and sheet 2 after delay D3. However, sheet 3 is delayed by the delay D6 which is greater than the difference between any one of the delays D2 and D3. The delayed D6 is made longer such that a sheet inserter 612 at the NSG can actually insert sheets into the transmission. A first inserted sheet INS 1 is illustrated which has delay D4 associated therewith and a second sheet INS 2 is illustrated as having a second delay D5 associated therewith. Therefore, the job will be arranged in the sequence of sheet 1, sheet 2, insert 1, insert 2 and sheet 3, there originally being a three sheet job. In this manner, information such as advertisements, cover sheets, etc. can be interposed into the job. This is to be compared with conventional systems that, at the most, can transmit a page of information prior to initiating the job or possibly even transmitting a page of information at the end of the job. The use of the dynamically determined delays allows for interspersing of inserts within the job itself. This is due to the fact that the job can be initially parsed, as described hereinabove.

Figure 13:
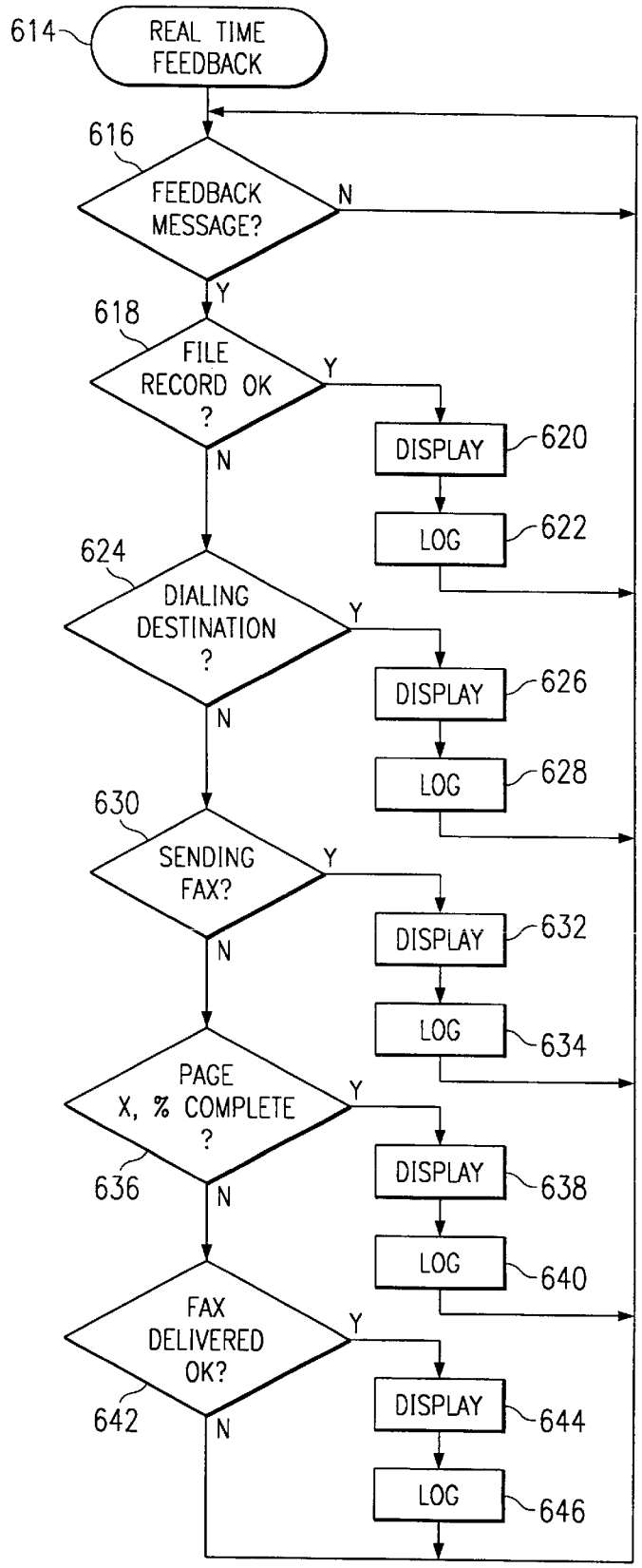
FIG. 13 illustrates a flow chart for real time feedback operation of the present invention.

In FIG. 13, there is illustrated a flow chart depicting the real time feedback operation wherein information as to the status of the facsimile delivery at the destination NSG is relayed back to the originating NSG and the FMS 60. As described above, the information that is sent back to the origination point can be either directed toward the FMS 60 or it can be directed toward the originating NSG. The description here with respect to FIG. 13 is specifically directed toward the FMS 60. However, it should be understood that whenever feedback information is sent to the NSG, the NSG that originated the message can store this information for later access thereof through a call-in network or it will be assembled into a fax sheet and forwarded to the originating fax machine. This mode, of course, is not real time with respect to the originating device.

Referring further to FIG. 13, the flow chart is initiated at a block 614 and then proceeds to a decision block 616 to determine if a feedback message has been received. As will be described hereinbelow, the feedback mechanism utilizes a control layer within the network by which control messages are forwarded to the originating device, these messages will go back to the device even though it may still be transmitting information thereto. The program will loop back around to the input thereof until the message is received, at which time it will proceed to a decision block 618 to determine if the message received indicates that it is a file reception verification. If so, the program will flow along a "Y" path to a function block 620 to display the information at the FMS 60 and then to a function block 622 to log the information into a log file. The program then proceeds back to the input of the decision block 616. If the message is not a file received verification message, the program will flow from decision block 618 to a decision block 624 to determine if the message is one of dialing destination. This message indicates that the NSG at the destination is in the process of dialing the destination number through the local PSTN 22. If so, the program will flow along the "Y" path to display block 626 to display the message and then to a function block 628 to log the information into the system and then back to the input of block 616. If the decision was negative at decision block 624, the program will flow to a decision block 630 to determine if the message is one indicating that the fax is being sent from the destination NSG to the destination fax. If so, the program will flow through a block 632 to display the information and then to a block 634 to log the information and then return. If the decision at decision block 630 was negative, the program will flow through a decision block 636 to determine if the message received is the page number that is being transmitted and the percent completion of the page. In addition to sending back a signal for the information as to the status of the job, the information is sent back frequently enough that it can relay information as to what percentage of a page has been sent. In the preferred embodiment, this is sent back in 10% increments. If this is a message that is received, the page number and the percent complete is displayed, as indicated by block 638 and then block 642 logs the information and then returns. If the information at decision block 636 was negative, the program will proceed to a decision block 642 to determine if the message that is sent is one indicating the fax that has been delivered. If so, the program will flow to a function block 644 to display that information and then to a log block 646 to log the information and then return. If the message at the block 642 was negative, the program will return from there, indicating that none of the messages had been sent.

The communications protocol utilized in the present invention is referred to as a "UDP Messaging Layer" (UDPML). This protocol is required since no currently available protocol would satisfy all of the needs for implementing a "generic messaging layer" required to provide the required messaging features necessary for the real time feedback operation and the various control features of the overall system. This messaging layer needs to be able to transport "user-definable" formats across the Internet in a "peer-to-peer" fashion, while still maintaining "client/server" functionality. The UDPML utilizes connectionless UDP packets for the OSI Transport layer instead of TCP. This messaging layer, therefore, needs to handle all reliability issues, ensuring that the data received was indeed the data that was sent.

This messaging layer is responsible for all interprocess communication between two or more computers needing to communicate over a LAN or WAN. This IPC includes much of the combined functionality of several of the standard protocols that are currently available, such as "FTP" ("File Transfer Protocol"), "RSH" ("Remote Shell"), "SNMP" ("Simple Network Management Protocol"), and general "TCP/IP" ("Transmission Control Protocol/Internet Protocol"). The concept underlying the UDPML protocol is to make this messaging layer abstract and generic, so that the functionality of these many diverse components are integrated into one "front-end" for the other programmers to use.

There are several reasons for choosing to use UDP ("User Datagram Protocol") instead of "TCP" ("Transmission Control Protocol") that will be described hereinbelow. In general, however, this protocol results in the sacrifice of the "reliable, stream-oriented, serialized, connection-oriented" nature of TCP to gain other advantages by using UDP for accomplishing the below-listed functional requirements. In a sense, by using UDP, the us of this protocol requires the designer to re-invent much of the functionality of TCP. Some of the major areas of concern in initially implementing such a protocol are:

1) guaranteed packet delivery.
2) packet integrity/checksums.
3) handling lost packets.
4) packet re-transmission.
5) packet serialization.
6) handling duplicate packets.

The major requirements for the "UDP Messaging Layer" (UDPML) are as follows:

1) will run on Windows 3.11/Windows95/Windows NT.
2) will run as an "add-on" on component to be included with other programs, specifically Visual Basic programs.

3) will provide for "user-definable" formats to be transmitted. (i.e. the contents of the packets sent can be decoded at runtime by the receiver based on some user pre-determined header format.)
4) will provide for sending the following "data types":
   a) string type
   b) integer type
   c) long integer type
   d) Visual Basic variant type
   e) complete files
5) will allow transmission to occur with any other node using this UDPML in either direction. (i.e. provide for "peer-to-peer" communication while still allowing traditional "client/server" functionality to exist, such as with FTP for transmitting entire files to a destination.)
6) will allow nodes to simultaneously communicate with, at a minimum, 24 other nodes.
7) will allow for multiple "streams" to simultaneously exist between the same two nodes.
8) There will be several other CPU-intensive programs running on the server.

Therefore, requirements 1, 6, 7, & 8 dictate that, if possible, all communications at the socket level need to be multiplexed on one server socket, and processed individually. (i.e. we won't have the CPU horsepower available to us to simply run 24 separate client programs, as needed by standard TCP.)

TCP, in general is a more desirable protocol to use than UDP because TCP, by definition, already takes care of all of the issues of guaranteeing that the data you sent from one end of the socket is received exactly the same as when it is sent. However, TCP has some limitations in the network of the present invention for a number of reasons, as follows:

1) The system needs to be able to multiplex the communications from one server to many clients through only one socket connection and only one executable program (or thread). TCP is connection-oriented, and thereby requires that one program "listen" for requested connections, and then spawn a separate program (or thread) to handle that connection only. UDP is "connectionless", and therefore can use a single socket to process packets for many different clients (provided there is additional information passed to the server to allow the server to differentiate one client program from another, e.g. the client's IP address and the socket port that it is transmitting on).

2) Many of the communication sessions will involve only a tiny amount of data. UDP by definition is best suited for small packet sizes (usually 1024 bytes or less, although the specifications call for 512 bytes). Under these circumstances, TCP would most likely have well over 100% overhead associated with the setup, transmission, and teardown of the connection to send this small amount of data. UDP, again, has no actual connection; it just blindly sends the data to the IP address and port you specify.

3) Under certain conditions, the system needs to be able to "blindly" send a packet to a certain IP address and port, and it really does not care if they get it or not. The data is not at all critical, and the system has no way of knowing if they are even still reachable on the network. If this is the case, the system does not want to waste its time and CPU resources trying to retransmit packets to them until it decides that they must not be reachable anymore. The system can not accomplish this with TCP, since we would have to wait until a connection to another IP address and port times out. The bottom line is: we need to use UDP, and reinvent the wheel as necessary to have UDP "guarantee" packet delivery when needed.

The UDPML is implemented, as stated above, in a "peer-to-peer" fashion, but still provides the functionality of "client/server" interactions. For clarity, the transmission specifications and descriptions are treated as being "client/server". In all occurrences, the computer that is sending the UDPML transmission stream is considered the "client", and the receiver is considered the "server".

At the "user" level, i.e. the OSI Application Layer level, the "user" program is required to do these following steps in order to facilitate sending data to another computer on the network:

1) populate a data structure with information particular to this transmission. The data structure is defined as follows:
   Type InfoType
     DataVal As Variant
     DataType As Integer
   End Type
   InfoArray(30) of InfoType
   (e.g. InfoArray(7).DataType=3' integer representation for StringType
   InfoArray(7).DataVal="This is a string.")

2) after all appropriate InfoArray( ) data structure entries have been populated, make a function call to function UDPSendInfoArray( ), specifying as parameters the destination IPAddress, destination Port Number, the InfoArray( ) data structure to send, and the number of InfoArray( ) entries to send. There is also a last parameter specifying whether or not we should request an acknowledgment from the receiver that they got the packet ok. If the contents of the InfoArray( ) will fit inside one packet, and this parameter specifies to "ignore the ACK", then the system sends it as a traditional UDP packet, and it does not care whether or not the receiver received it. This is used extensively to update other nodes with information, if they happen to still be listening. If they are not still connected and listening, the system does not care.

The UDPML on the sender side will parse the InfoArray( ), do rudimentary error checking, and decide if the InfoArray( ) will fit inside of one packet. If it will fit inside one packet, it is known as a UniPacket. If a file transfer is requested (by having one or more "InfoArray( ).DataType=TypeFile"), then a UniPacket is not allowed. If this transmission is a UniPacket, all information is sent with one UDP packet. Otherwise, a stream of UDP packets is initiated.

On the receiver side, either the UniPacket or the stream of UDP packets is received and decoded. Once the entire transmission has been received, the upper-level program is alerted via an event generated, known as a UserUDPEvent( ). The upper-level program receives as a parameter the InfoArray( ) structure with the information that was sent, which it then decodes in a reverse fashion as described above for the encoding process. Once the transmission has been completed, the sender program is also alerted with a UserUDPEvent( ), specifying, via the EventType parameter, that the transmission is complete.

In order to facilitate the UDPML transmission or reception, the program needs to open a Winsock.dll or Wsock32.dll library, and create a Datagram socket (UDP) that it will listen on and send to. As implemented in the present embodiment, these are both the same socket. This socket is defined by two parameters, namely the IPAddress and the port number that is chosen. Together, these two define the UDP Datagram socket. However, for purposes of being able to have several "streams" or "conversations" going on simultaneously on this socket, the concept of a "socket" is defined by three parameters: the IPaddress, the port number, and now a "SendIndex", which is part of the header information passed with each socket sent. This SendIndex designates which of the (possibly) many "streams" are being duplexed onto this physical "socket". Now the idea of a "socket" becomes more of a "virtual socket", but it will be referred to as a "virtual socket"— henceforth as just "socket".

With this SendIndex defining part of the socket, the need to maintain a separate stream for each SendIndex is defined. This is implemented as an array of "socket" data structures, one for each SendIndex. This allows the system to maintain all necessary state information, etc., for each transmission separately. As stated earlier, the system is responsible for all "reliability" issues. Therefore it serializes each packet sent on a stream. This simply means sending as part of the header the incremental packet number within this stream. This is used to check for lost packets, packets received out of order, or duplicate packets received. The basic functionality here is that, once a new stream has been initiated, if the receiver receives any packet numbered lower than the one it is expecting, the packet is ignored. If it receives a packet that is numbered higher than the one it is expecting, it sends back a NAK to signal a lost packet. If it received the numbered packet that it is expecting, it processes it, then sends back an ACK, unless the packet was a UniPacket sent requesting no ACK be sent back. If the packet received has a bad "checksum", a NAK is sent back, meaning to re-send this packet.

On the sender side, if an ACK is expected for a transmission, then a timer is set to expire if the packet has not been ACKed before the timeout interval. If the packet is ACKed in time, the timer is disabled, and the next packet in the stream is sent. If the packet timer does expire before the packet has been ACKed, then that packet is retransmitted, and the timer is set again. If a maximum number of timeouts have occurred on a packet during an attempted transmission, then the transmission is aborted, and the sender program is alerted via a UserUDPEvent( ).

The basic protocol definition for UDPML will now be described. This definition holds for a "sliding window" of size one, meaning there is at most only one outstanding packet at any given time during the transmission. One packet is sent, and the next packet is not sent until the last packet has been ACKed. UDPML is presently implemented with a variable "sliding window" size, with a default value of ten. This means that ten packets are sent in a row, with the normal ACK processing as defined above holding true. If packets 1–10 are sent, as soon as packet 1 is ACKed, packet 11 will be sent, and so forth. The intention is to minimize the latency inherent in receiving packets once they are sent.

Since multiple packets can be outstanding at any given time, there is additional logic that needs to be incorporated into the algorithm. Hereinabove, it was somewhat erroneously stated that if the receiver received a packet with a higher number than it was expecting it sent back a NAK to the sender. Until a "sliding window" is introduced, it is theoretically impossible to ever receive a packet that is numbered higher than the one the system is expecting, because the sender never would have been in a state to send this higher numbered packet until the last packet was ACKed. Now, with a "sliding window", this, as well as a couple of other scenarios are possible, and need to be dealt with.

If a packet is received that is numbered higher than the one the system is expecting, then the system sends back a NAK packet asking for the packet that it is expecting, and then store the systems internal state to represent this fact. Most likely, if one packet was lost, with a "sliding window" size of (N), the system will probably end up getting (N−1) higher numbered packets, and it is not desirable to send back that many NAK's, because each one of these NAK's received by the sender will result in the entire "sliding window" size of packets to be resent. For example, with a "sliding window" size of ten, if packet one were lost, and if the system did send back a NAK for each of the remaining nine packets that were received out of order, then the sender would re-send the entire ten packet a total of nine times, resulting in 90 packets re-sent, when all that was needed was for ten packets to be re-sent.

This brings up a couple of points on the sending side. The sender keeps in an array in memory the "sliding window" size of packets that have been sent that are still outstanding. If the system receives a NAK, then the entire "sliding window" of packets is re-sent. If the system receives an ACK for the first element of the "sliding window", the system slides the window forward by one, and sends the next packet in the stream. Also, if the Packet timer expires, meaning that the system has not received an ACK on one or more of the packets sent, then the entire "sliding window" of packets is re-sent.

In summary, there has been provided a network that utilizes a plurality of translation nodes that are operable to receive facsimile images from a fax machine and compress these images for transmission over a network to another translation node. Each of the translation nodes is operable to transmit the compressed/encrypted image at a much faster rate than the fax machine transmission. At one of the nodes associated with the destination end, the image information is received, decompressed and de-encrypted and then transmitted in a normal manner to the destination fax. Since there are a plurality of nodes in the system, the route that the compressed/encrypted information takes is a function of various parameters that are based upon cost, speed, etc. This is determined based upon predetermined configuration information. The system will continually relay information from the destination end to the originating end as to information regarding the status of the fax transmission.

Although the preferred embodiment has been described in detail, it should be understood that various changes, substitutions and alterations can be made therein without departing from the spirit and scope of the invention as defined by the appended claims.

What is claimed is:

1. A facsimile transmission system, comprising:

a first network;

a fax source for generating a fax transmission and transmitting the generated fax transmission over said first network in a first facsimile transaction;

a buffer node interfaced with said first network for receiving said fax transmission therefrom during said first facsimile transaction, said buffer node including:

a buffer storage area for storing at least a portion of said received fax transmission during said first facsimile transaction, a fax transmission device for initiating a fax connection to a destination fax system in a second facsimile transaction separate from said first facsimile transaction, a fax delivery system for delivering during said second facsimile transaction said received fax transmission to said destination fax system independent of the operation of said fax source and capable of operating after completion of said first facsimile transaction, and a status device for determining the status of the fax delivery by said fax delivery system to said destination fax system and forwarding said status information to said fax source of said first facsimile transaction during the delivery operation of said fax transmission to said destination fax by said fax delivery device at said buffer node and during said second facsimile transaction, such that status information of the delivery of less than all of said fax transmission can be sent to said fax source prior to the delivery of all of said fax transmission; and said fax source having a storage area associated therewith for storing said received status information.

2. The facsimile system of claim 1, wherein said fax source further includes a display for displaying said received status information from said first network.

3. The facsimile system of claim 1, wherein said first network includes a public switched telephone network (PSTN) and said fax source includes a fax system that is operable to send a fax transmission over said PSTN in a format compatible therewith.

4. The facsimile system of claim 3, wherein said first network includes:

a global data network interfaced with said buffer node;

an intermediate node for interfacing with said PSTN and receiving said fax transmission thereover; and a translation device for translating said received fax transmission from a protocol compatible with said PSTN to a protocol compatible with said global data network.

5. The facsimile system of claim 4, wherein said intermediate node includes a compression device for compressing said translated information prior to transmission to said buffer node over said global data network as said fax transmission, and said buffer node further comprising a decompression device for decompressing said received fax transmission.

6. The facsimile system of claim 4, wherein said intermediate node includes an encryption device for encrypting said translated information prior to transmission to said buffer node over said global data network as said fax transmission, and said buffer node further comprising a decryption device for decrypting said received fax transmission.

7. The facsimile system of claim 1, wherein said first network comprises a global data network and said fax source is operable to transmit information over said global data network as image information in a predetermined protocol, which constitutes said fax transmission.

8. The facsimile system of claim 7, wherein said fax source includes a compression device for compressing said image information prior to transmission to said buffer node over said global data network and said buffer node further comprising a decompression device for decompressing said received fax transmission.

9. The facsimile system of claim 7, wherein said fax source node includes an encryption device for encrypting said image information prior to transmission to said buffer node over said global data network and said buffer node further comprising a decryption device for decrypting said received fax transmission.

10. The facsimile system of claim 1, wherein said fax transmission device in said buffer nodes initiates said fax connection prior to receipt of all of said received fax transmission by said buffer node.

11. The facsimile system of claim 10, wherein said fax transmission device in said buffer node initiates said fax connection to said destination fax system prior to the receipt of the end of said fax transmission by said buffer node.

12. The facsimile system of claim 1, wherein said fax delivery device includes a delay device for delaying the delivery of select portions of said fax transmission during transmission thereof to said destination fax system by said fax delivery device.

13. The facsimile system of claim 12, wherein said delay device includes an insertion device for inserting information within said facsimile transmission during transmission thereof to increase the length of said facsimile transmission over that of said received facsimile transmission by said buffer node such that said facsimile transmission can be modified during transmission thereof to said destination fax system.

14. The facsimile system of claim 13, wherein said facsimile transmission is comprised of a plurality of pages and wherein said insertion device is operable to insert additional pages into said facsimile transmission in the middle thereof during transmission thereof to said destination fax system.

15. A method for facsimile transmission, comprising the steps of:

providing a first network;

generating a fax transmission at a fax source and transmitting the generated fax transmission over the first network in a first facsimile transaction;

interfacing a buffer node with the first network and receiving the fax transmission at the buffer node from the first network during said first facsimile transaction;

storing at least a portion of the received fax transmission in a buffer storage area at the buffer node during said first facsimile transaction;

initiating a fax connection from the buffer node to a destination fax system in a second facsimile transaction separate from said first facsimile transaction and independent of the operation of the fax source;

delivering the received fax transmission to the destination fax system during said second facsimile transaction over the established fax connection from the buffer node to the destination fax system;

determining the status of the fax delivery from the buffer node to the destination fax system;

forwarding the status information from the buffer node to the fax source after completion of said first facsimile transaction through the first network during the delivery operation of the fax transmission to the destination fax by the step of delivering at the buffer node and during said second facsimile transaction, the step of forwarding status information beginning prior to the completion of said second fax transmission, such the status information of the delivery of less than all of said second fax transmission can be sent to said fax source prior to the delivery of all of said second fax transmission; and storing the received status information at the fax source.

16. The method of claim 1, and further comprising the step of displaying the received status information from the first network at the fax source.

17. The method of claim 1, wherein the step of providing the first network comprises providing a first network that includes a public switched telephone network (PSTN) and the step of providing the fax source includes the step of providing a fax system that is operable to send the fax transmission over the PSTN in a format compatible therewith.

18. The method of claim 17, wherein the step of providing the first network includes the steps of:

providing a global data network and interfacing the global network with the buffer node;

interfacing an intermediate node with the PSTN and receiving the fax transmission thereover; and translating the received fax transmission from a protocol compatible with the PSTN to a protocol compatible with the global data network and transmitting the translated information thereto.

19. The method of claim 18, and further comprising the step of compressing the translated information prior to transmission to the buffer node from the intermediate node, and the step of decompressing the received fax transmission at the buffer node upon reception thereof.

20. The method of claim 18, and further comprising the step of encrypting the translated information prior to transmission to the buffer node and the step of decrypting the received data at the buffer node upon reception thereof.

21. The method of claim 1, wherein the step of initiating the fax connection operates to initiate the fax connection prior to receipt of all of the received fax transmission by the buffer node.

22. The method of claim 21, wherein the step of initiating the fax connection is operable to initiate the fax connection to the destination fax system prior to the receipt of the end of the fax transmission by the buffer node.

23. The method of claim 1, wherein the step of delivering the fax transmission further includes the step of delaying the delivery of select portions of the fax transmission during transmission thereof to the destination fax system by the step of delivering.

24. The method of claim 23, wherein the step of delaying includes the step of inserting information within the facsimile transmission during transmission thereof to increase the length of the facsimile transmission over that of the received facsimile transmission at the buffer node, such that the facsimile transmission can be modified during transmission thereof to the destination fax system.

* * * * *